(12) United States Patent
Graham et al.

(10) Patent No.: US 7,738,750 B2
(45) Date of Patent: Jun. 15, 2010

(54) COMPACT, LOW-LOSS OPTICAL WAVELENGTH MULTIPLEXER/DEMULTIPLEXER

(75) Inventors: Alan C. Graham, Cupertino, CA (US); Ronald P. Bevis, Morgan Hill, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 41 days.

(21) Appl. No.: 12/113,033

(22) Filed: Apr. 30, 2008

(65) Prior Publication Data
US 2009/0274415 A1 Nov. 5, 2009

(51) Int. Cl.
*G02B 6/28* (2006.01)
(52) U.S. Cl. .......................... 385/24; 385/48
(58) Field of Classification Search ............. 385/47
See application file for complete search history.

(56) References Cited

U.S. PATENT DOCUMENTS

| | | | |
|---|---|---|---|
| 5,321,774 A * | 6/1994 | Barnard et al. ............ | 385/16 |
| 5,796,510 A | 8/1998 | Yao | |
| 6,061,481 A | 5/2000 | Heidrich et al. | |
| 6,694,066 B2 * | 2/2004 | Xie et al. ................ | 385/11 |
| 6,760,160 B2 * | 7/2004 | Zhang et al. ............. | 359/629 |
| 6,845,191 B1 | 1/2005 | Xie et al. | |
| 7,263,250 B1 * | 8/2007 | Wang et al. .............. | 385/16 |
| 2001/0012429 A1 | 8/2001 | Wach et al. | |
| 2003/0113060 A1 * | 6/2003 | Sugita et al. ............. | 385/24 |
| 2005/0111772 A1 * | 5/2005 | Du et al. ................ | 385/11 |
| 2006/0044523 A1 | 3/2006 | Teijdo et al. | |
| 2007/0008537 A1 | 1/2007 | King | |
| 2007/0230871 A1 | 10/2007 | Bidnyk et al. | |

OTHER PUBLICATIONS

PCT International Search Report, Jun. 22, 2009.

\* cited by examiner

*Primary Examiner*—Sung H Pak

(57) ABSTRACT

The multiplexer/demultiplexer has a planar reflector, a planar first filter element and a planar second filter element offset from the first filter element in a first direction to receive light reflected and transmitted from a first location on the first filter element. The first and second filter elements have orthogonal surface normals. The reflector is parallel to the second filter element and is offset therefrom in a second direction, orthogonal to first direction, to receive light reflected and transmitted from a second location, offset from the first location in the second direction, on the first filter element. The first and second filter elements each transmit and reflect light in non-overlapping wavelength ranges, and one of them has a band-pass or band-stop transmission characteristic.

24 Claims, 13 Drawing Sheets

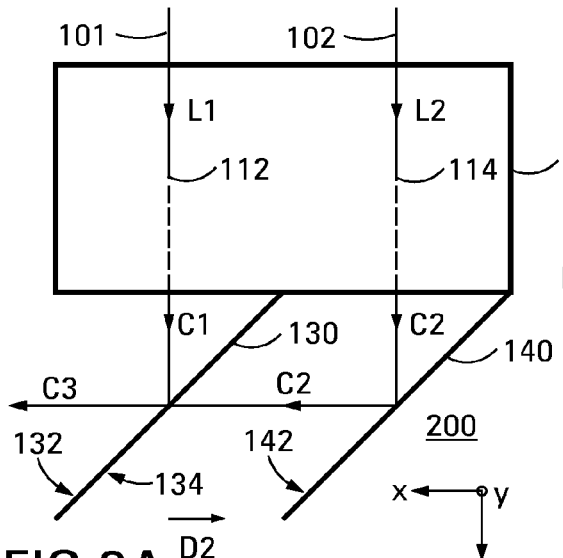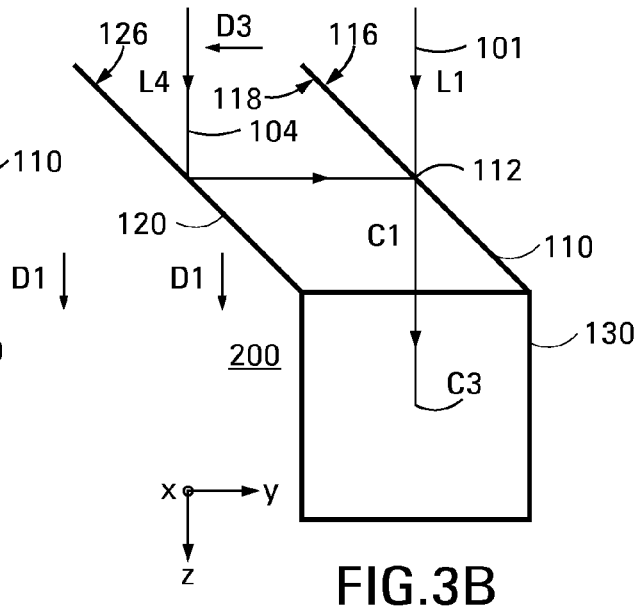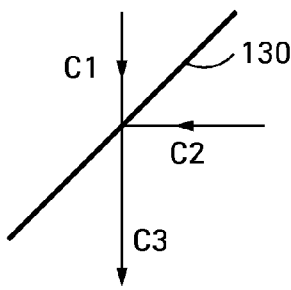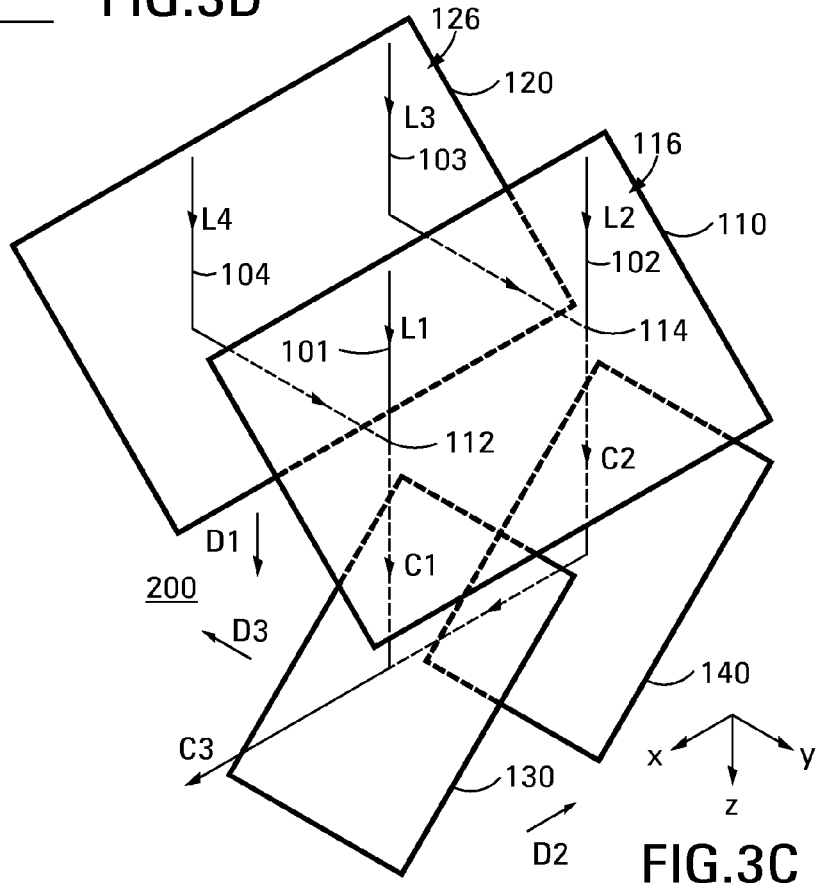

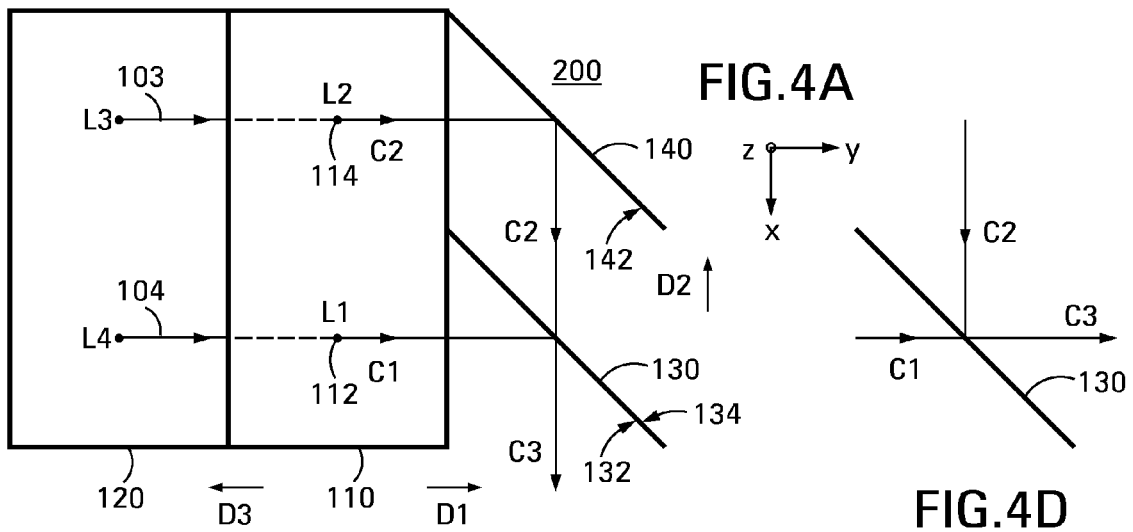
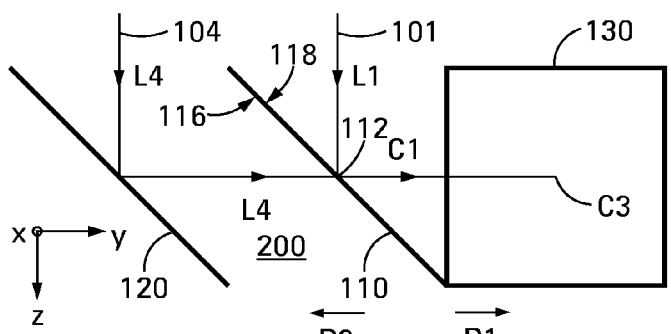
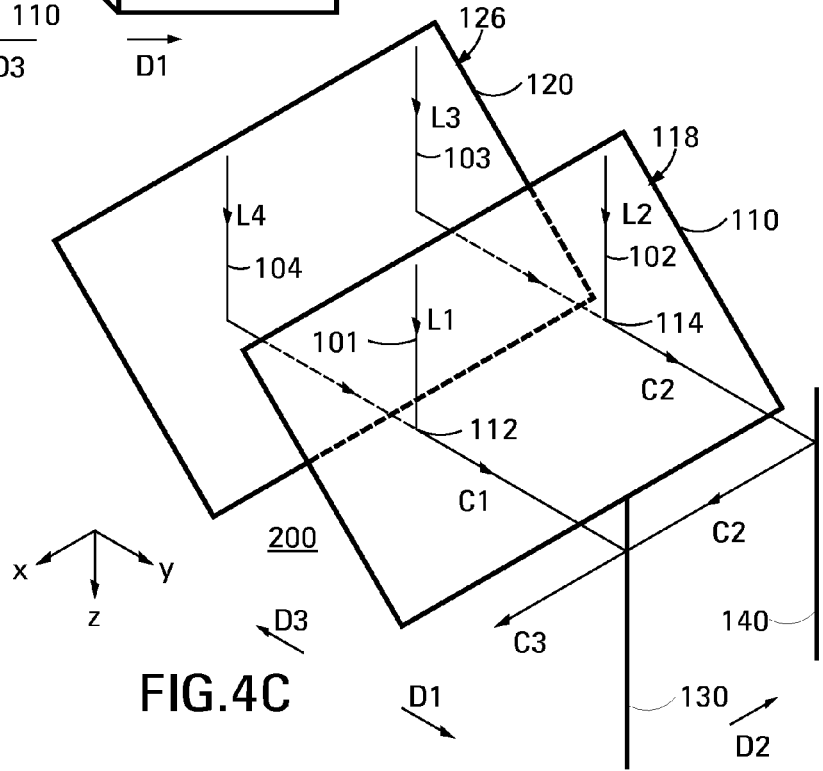

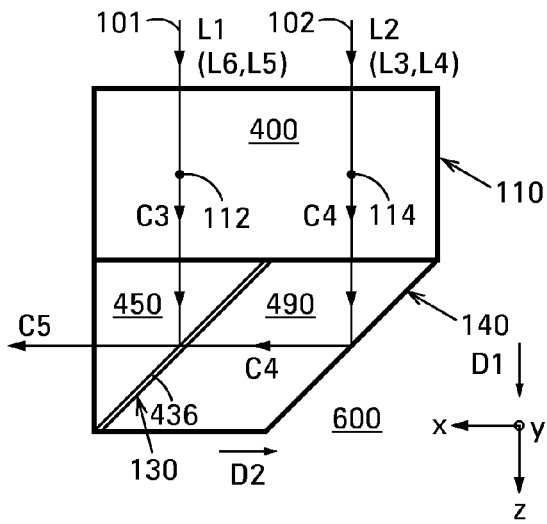
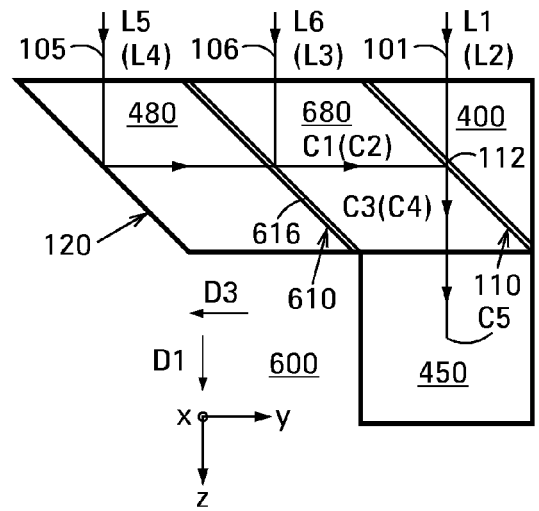
FIG. 10A
FIG. 10B
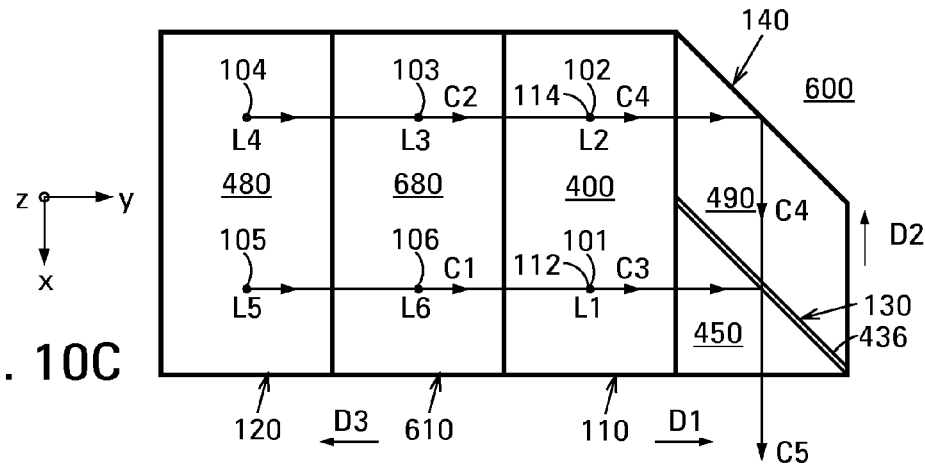
FIG. 10C
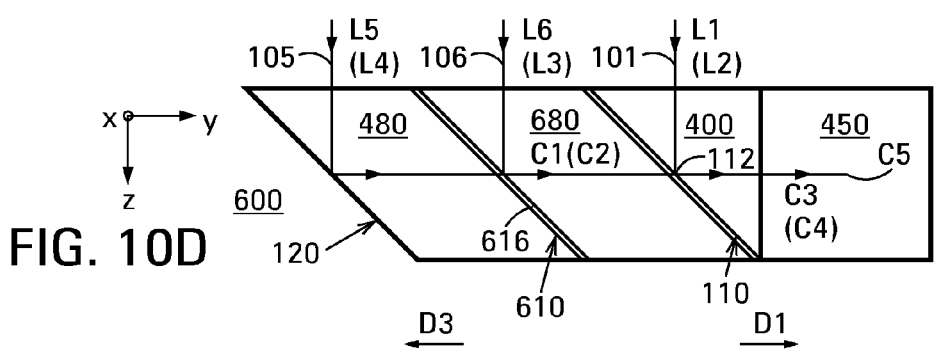
FIG. 10D

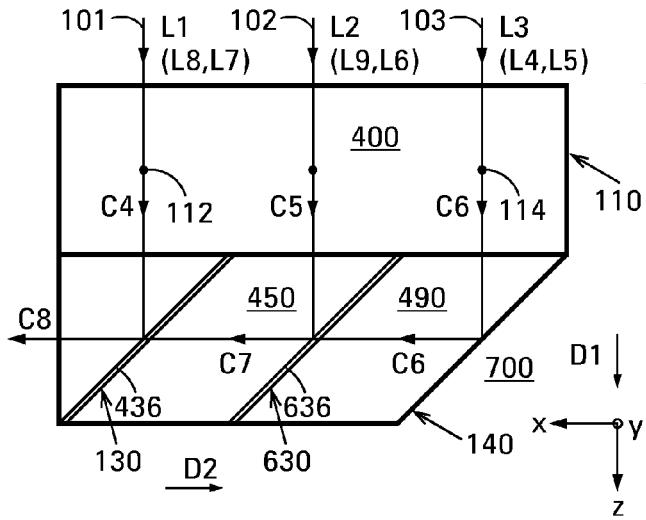
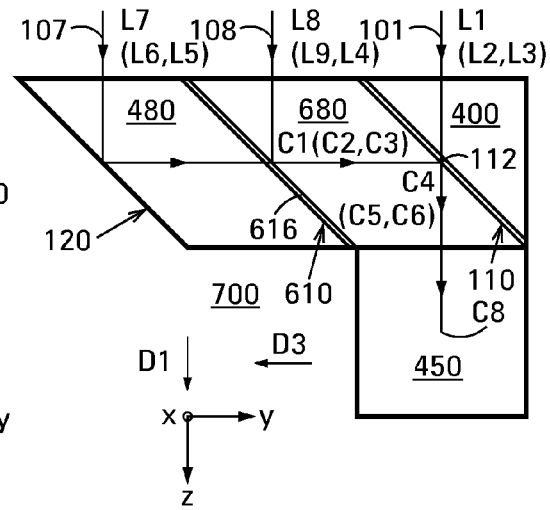
FIG. 12A          FIG. 12B
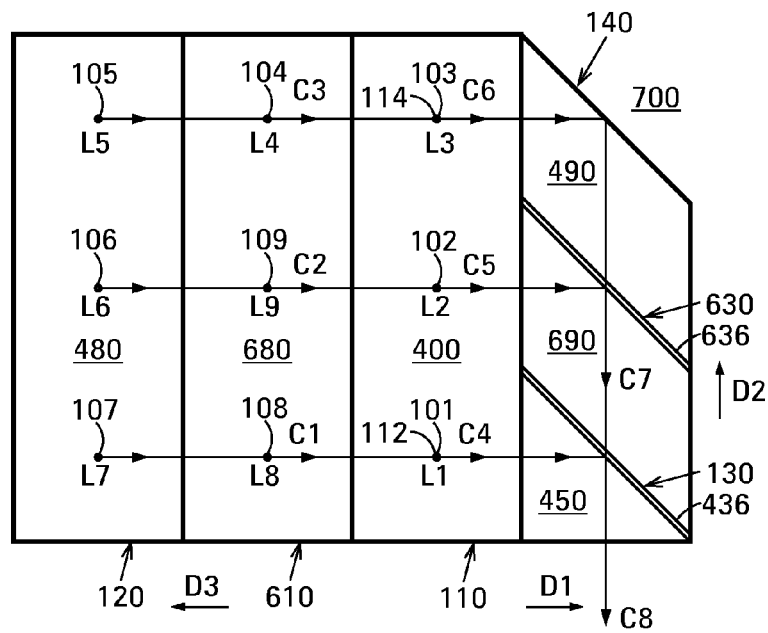
FIG. 12C
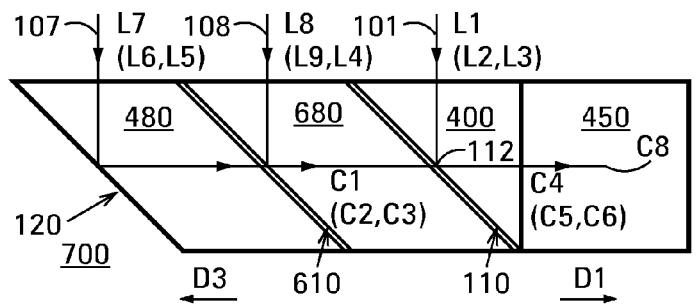
FIG. 12D

COMPACT, LOW-LOSS OPTICAL WAVELENGTH MULTIPLEXER/DEMULTIPLEXER

BACKGROUND

Many applications use an optical wavelength multiplexer to combine component light beams having mutually-different wavelengths into a single, multi-wavelength combined light beam. Such applications may additionally use, and other applications use an optical wavelength demultiplexer to divide a multi-wavelength combined light beam into its constituent component light beams having mutually-different wavelengths. Examples of such applications include optical communication systems and optical microscopy. Optical wavelength multiplexing and demultiplexing is optical multiplexing and demultiplexing based on wavelength rather than on some other optical property such as polarization state.

With many optical wavelength multiplexer and optical wavelength demultiplexer designs, the same optical device can be used to perform optical wavelength multiplexing or to perform optical wavelength demultiplexing simply by reversing the direction in which light travels through the device. Accordingly, as used in this disclosure, the term multiplexer encompasses a multiplexer and a demultiplexer, the exact function depending on the direction in which the light travels. Similarly, the term multiplexing encompasses multiplexing and demultiplexing, depending on the direction in which the light travels.

Lasers and LEDs are increasingly being used as light sources in a variety of epifluorescence and confocal fluorescence (including cytometry) applications. Light beams contributed by multiple discrete light sources in illumination subassemblies typically must be coaxial with arcsecond precision as they emerge from the multiplexer as a single combined beam prior to illuminating a test sample. In imaging subassemblies, light returning from the test sample is spectrally separated by an optical demultiplexer with similar precision requirements to ensure high measurement quantification and reproducibility when the separated component beams are detected.

In conventional optical wavelength multiplexers, at least some of the light beams subject to multiplexing pass through many beam-splitting surfaces, each of which has a transmission loss typically the range from 4% to 8%, although losses less than this can be obtained under carefully-controlled conditions. This results in a loss of optical intensity. For example, in a multiplexer that multiplexes eight component light beams, the intensity of some of the component light beams output by the multiplexer or demultiplexer is in the range from about 45% to 66% of the original intensity. In microscopy, each component light beam is subject to both multiplexing and demultiplexing, which multiples the intensity loss.

Accordingly, what is needed is an optical wavelength multiplexer/demultiplexer having lower optical losses than a conventional optical wavelength multiplexer/demultiplexer.

BRIEF DESCRIPTION OF THE DRAWINGS

FIGS. 3A-3C are respectively a side view, a front view and an isometric view showing an example of an X-Z configuration of an optical wavelength multiplexer/demultiplexer in accordance with an embodiment of the invention in which all the incident light beams have a common direction of incidence.

FIG. 3D is side view of part of the multiplexer/demultiplexer shown in FIGS. 3A-3C in which the second filter element has a different transmission characteristic.

FIGS. 4A-4C are respectively a plan view, a front view and an isometric view showing an example of an X-Y configuration of the optical wavelength multiplexer/demultiplexer shown in FIGS. 3A-3C.

FIG. 4D is side view of part of the multiplexer/demultiplexer shown in FIGS. 4A-4C in which the second filter element has a different transmission characteristic.

FIGS. 10A and 10B are respectively a side view and a front view showing an example of an optical wavelength multiplexer/demultiplexer based on the multiplexer/demultiplexer shown in FIGS. 3A-3C with an additional first filter element.

FIGS. 10C and 10D are respectively a plan view and a front view showing an example of an optical wavelength multiplexer/demultiplexer based on the multiplexer/demultiplexer shown in FIGS. 4A-4C with an additional first filter element.

FIGS. 12A and 12B are respectively a side view and a front view showing an example of an optical wavelength multiplexer/demultiplexer based on the multiplexer/demultiplexer shown in FIGS. 3A-3C with an additional first filter element and an additional second filter element.

FIGS. 12C and 12D are respectively a plan view and a front view showing an example of an optical wavelength multiplexer/demultiplexer based on the multiplexer/demultiplexer shown in FIGS. 4A-4C with an additional first filter element and an additional second filter element.

DETAILED DESCRIPTION

Figure 1A:
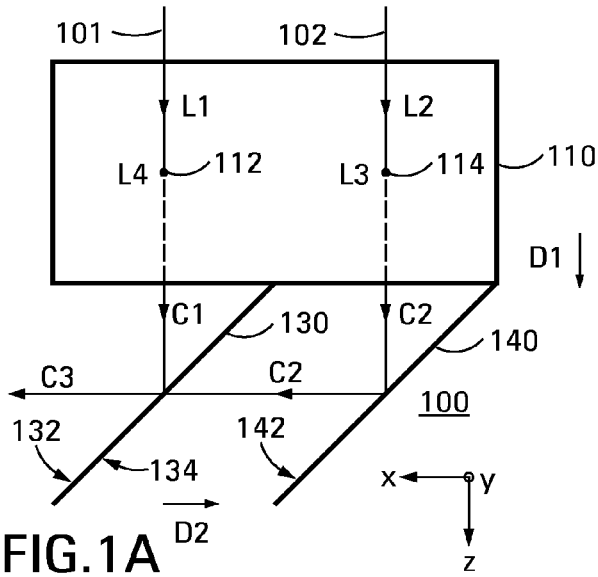
FIGS. 1A-1C are respectively a side view, a front view and an isometric view showing an example of an optical wavelength multiplexer/demultiplexer in accordance with an embodiment of the invention. In this example, which will be described as having an X-Z configuration, the locations at which light beams are incident on the various elements of the multiplexer all lie in an x-z plane.
Figure 1B:
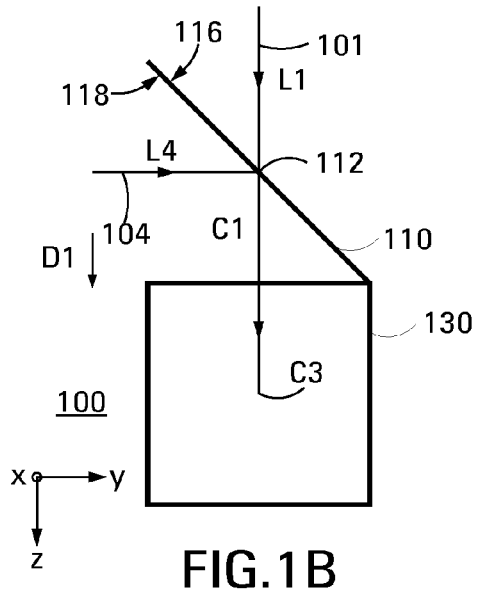
Figure 1D:
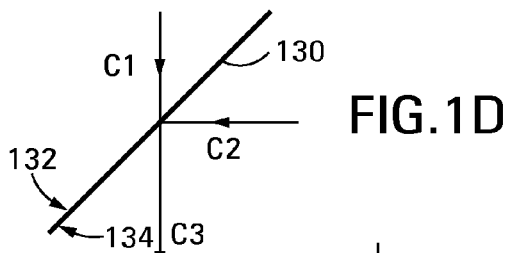
FIG. 1D is side view of part of the multiplexer/demultiplexer shown in FIGS. 1A-1C in which the second filter element has a different transmission characteristic.
Figure 1C:
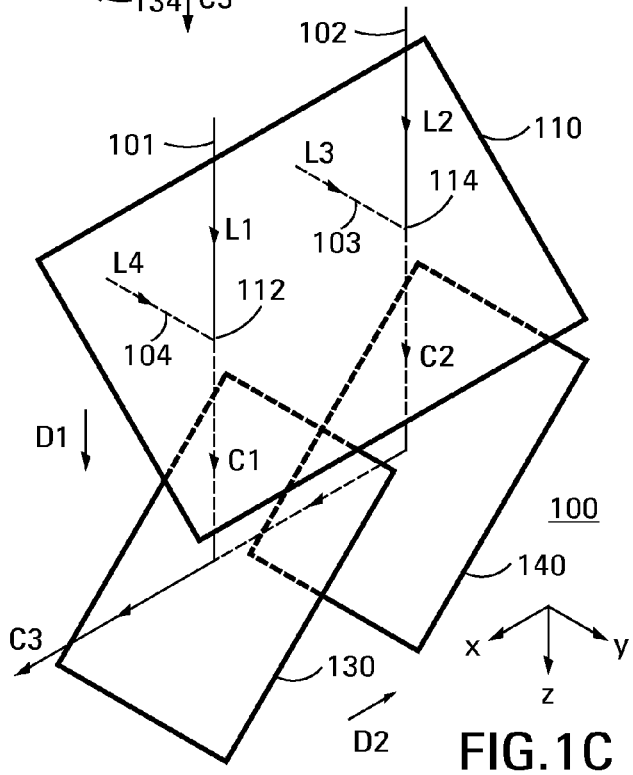

FIGS. 1A-1C are respectively a side view, a front view and an isometric view showing an example of an optical wavelength multiplexer/demultiplexer 100 in accordance with an embodiment of the invention. For brevity, optical wavelength multiplexer/demultiplexer 100 will be referred to below as multiplexer 100 on the understanding that multiplexer 100 can additionally function as an optical demultiplexer simply by reversing the direction in which light travels through it.

Multiplexer 100 is composed of a planar first filter element 110, a planar second filter element 130 and a planar reflector 140. Second filter element 130 is offset from first filter element 110 in a first direction D1 to receive light reflected and transmitted from a first location 112 on first filter element 110. Second filter element 130 and first filter element 110 have orthogonal surface normals, i.e., a normal (not shown) to the surface of second filter element 130 is orthogonal to a normal (not shown) to the surface of first filter element 110. Reflector 140 is parallel to second filter element 130 and is offset from the second filter element in a second direction D2 to receive light reflected and transmitted from a second location 114 on first filter element 110. Second direction D2 is orthogonal to first direction D1. Second location 114 is offset from first location 112 in second direction D2.

In multiplexer 100, each of first filter element 110 and second filter element 130 is configured to transmit light and to reflect light in respective non-overlapping wavelength ranges. Additionally, first filter element 110 and second element 130 has either a band-pass transmission characteristic or a band-stop transmission characteristic. The reflection characteristic of each filter element is complementary to the transmission characteristic, subject to an allowable loss factor. Consequently, the above described properties of the filter elements 110 and 130 could alternatively be defined in terms of their reflection characteristics An idealized filter element having a band-pass transmission characteristic transmits light at wavelengths within a defined range of wavelengths that will be called a pass band, and does not transmit light at wavelengths within two other defined wavelength ranges, called stop bands, one shorter and one longer in wavelength than the pass band. Moreover, such filter element having a band-pass transmission characteristic reflects light at wavelengths within the stop bands, and does not reflect light at wavelengths within the pass band. A filter element having a band-stop transmission characteristic does not transmit light at wavelengths within a single defined stop band and transmits light at wavelengths within two defined pass bands, one shorter and one longer in wavelength than the stop band. Moreover, such filter element having a band-stop transmission characteristic reflects light at wavelengths within the stop band, and does not reflect light at wavelengths within the pass bands.

A filter element having a short-pass transmission characteristic transmits light at wavelengths within a defined range of wavelengths, called a pass band, shorter in wavelength than a defined cut-on wavelength, and does not transmit light at wavelengths within a defined range of wavelengths, called a stop band, longer in wavelength than the cut-on wavelength. Moreover, such filter element having a short-pass transmission characteristic reflects light at wavelengths within the stop band, and does not reflect light at wavelengths within the pass band. A filter element having a long-pass transmission characteristic transmits light at wavelengths within a defined pass band longer in wavelength than a defined cut-on wavelength and does not transmit light at wavelengths within a defined stop band shorter in wavelength than the cut-on wavelength. Moreover, such filter element having a long-pass transmission characteristic reflects light at wavelengths within the stop band, and does not reflect light at wavelengths within the pass band.

Descriptions similar to above descriptions apply to the real-world filter elements that constitute part of multiplexer 100, but, in such descriptions, the terms "transmits" and "reflects" in the description above are replaced by "transmits with less than a defined loss" and "reflects with less than a defined loss." Similarly, the terms "does not transmit" and "does not reflect" are replaced by "transmits with greater than a defined attenuation" and "reflects with greater than a defined attenuation." Moreover, in multiplexer 100, each of the filter elements has defined characteristics at the wavelengths of all of the light beams incident thereon.

Light beams L1, L2, L3 and L4 having mutually-different wavelengths are incident on first filter element 110. Light beam L1 and light beam L2 are incident at first location 112 and second location 114, respectively, on first filter element 110. First location 112 is aligned with second filter element 130 and second location 114 is aligned with reflector 140. The wavelengths of light beams L1 and L2 are within the one or more wavelength ranges transmitted by first filter element 110. Consequently, first filter element 110 transmits light beam L1 and light beam L2 towards second filter element 130 and reflector 140, respectively. Light beam L3 and light beam L4 are incident at the second location 114 and the first location 112, respectively, on first filter element 110. The wavelengths of light beams L3 and L4 are within the one or more wavelength ranges reflected by first filter element 110. Consequently, first filter element 110 reflects light beam L3 and light beam L4 towards reflector 140 and second filter element 130, respectively. First filter element 110, second filter element 130, reflector 140, first location 112 and second location 114 are arranged such that multiplexer 100 outputs light beams L1 through L4 as a single combined beam C3.

In embodiments in which first filter element 110 has a band-pass transmission characteristic, the wavelengths of light beams L1 and L2 are within the same wavelength range transmitted by the first filter element and the wavelengths of light beams L3 and L4 are within different wavelength ranges reflected by the first filter element. In embodiments in which first filter element 110 has a band-stop transmission characteristic, the wavelengths of light beams L1 and L2 are within different wavelength ranges transmitted by the first filter element and the wavelengths of light beams L3 and L4 are within the same wavelength range reflected by the first filter element. In embodiments in which first filter element 110 has a short-pass or a long-pass transmission characteristic, the wavelengths of light beams L1 and L2 are within a first wavelength range transmitted by the first filter element and the wavelengths of light beams L3 and L4 are within a second wavelength range reflected by the first filter element. The first and second wavelength ranges do not overlap.

The exemplary multiplexer 100 will now be described in more detail with reference to FIGS. 1A-1C in which three, mutually-orthogonal directions, namely, an x-direction, a y-direction, and a z-direction are additionally shown. In the example of multiplexer 100 shown, planar first filter element 110 has a plane surface 116 oriented at 45° relative to the x-y plane, a plane surface 118 opposite and parallel to surface 116, and a surface normal (not shown) parallel to the y-z plane. Each of second filter element 130 and reflector 140 has a plane surface oriented at −45° relative to the x-y plane, and has a surface normal (not shown) parallel to the x-z plane, and therefore orthogonal to the surface normal of first filter element 110. Second filter element 130 and reflector 140 are offset from first filter element 110 in the z-direction. Reflector 140 is offset from second filter element 130 in the −x-direction. Second location 114 is offset from first location 112 in the −x-direction by a distance equal to the offset of reflector 140 from second filter element 130.

Light beams L4 and L3 travel in the y-direction and are incident at first location 112 and second location 114, respectively, on surface 118 of first filter element 110. Surface 118 faces towards second filter element 130 and reflector 140. Each of light beams L4 and L3 has an angle of incidence of 45° on surface 118. In this disclosure, angles of incidence and reflection are measured relative to the normal to the reflective surface. First filter element 110 is reflective at the wavelengths of light beams L4 and L3 and therefore reflects light beams L4 and L3 towards second filter element 130 and second reflector 140, respectively.

Light beams L1 and L2 travel in the z-direction and are incident at first location 112 and second location 114, respectively, on the surface 116 of first filter element 110. Surface 116 faces away from second filter element 130 and reflector 140. First filter element 110 is transmissive at the wavelengths of light beams L1 and L2 and therefore transmits light beams L1 and L2 towards surface 118.

Light beam L1 emerges from surface 118 and combines with light beam L4 reflected by first filter element 110 to form a combined beam C1 that travels in the z-direction towards second filter element 130. Light beam L2 emerges from surface 118 and combines with light beam L3 reflected by first filter element 110 to form a combined beam C2 that travels in the z-direction towards reflector 140.

Combined beam C1 is incident on a surface 132 of second filter element 130 at an angle of incidence of 45°. Surface 132 faces away from reflector 140. Second filter element 130 is reflective at the wavelengths of light beams L1 and L4 constituting combined beam C1 and therefore reflects combined beam C1 in the x-direction.

Combined beam C2 travels in the z-direction and is incident on a surface 142 of reflector 140 at an angle of incidence of 45°. In the example shown, reflector 140 has a high reflectivity over a broad range of wavelengths, including the wavelengths of light beams L2 and L3. In other examples, reflector 140 has a wavelength-dependent reflectivity; for example, a high reflectivity at the wavelengths of light beams L2 and L3 and a low reflectivity, and, hence, a high transmissivity, at other wavelengths. This allows such examples of reflector 140 to combine additional light beams with combined beam C2, as will be described in more detail below with reference to FIG. 8.

Reflector 140 reflects combined beam C2 with an angle of reflection of 45°. After reflection, combined beam C2 travels in the x-direction towards a surface 134 of second filter element 130. Surface 134 is opposite surface 132 of second filter element 130 and faces reflector 140. Combined beam C2 is incident on surface 134 of second filter element 130 at a location opposite that on surface 132 where combined beam C1 is incident. Second filter element 130 is transmissive at the wavelengths of light beams L2 and L3 constituting combined beam C2, and therefore transmits combined beam C2 towards surface 132. Combined beam C2 emerges from surface 132 and combines with combined beam C1 reflected by second filter element 130 to form a combined beam C3. Combined beam C3 travels in the x-direction and is output from multiplexer 100.

In another example illustrated in a side view shown in FIG. 1D, second filter element 130 is transmissive at the wavelengths of light beams L1 and L4 constituting combined beam C1, and is reflective at the wavelengths of light beams L2 and L3 constituting combined beam C2. Second filter element 130 therefore reflects combined beam C2 incident on its surface 134 in the z-direction, and transmits combined beam C1 incident on its surface 132 towards surface 134. Combined beam C1 emerges from surface 134 and combines with combined beam C2 reflected by second filter element 130 to form combined beam C3. Combined beam C3 travels in the z-direction and is output from multiplexer 100.

In the example shown in FIGS. 1A-1C, a first beam path 101 extends in the z-direction towards first location 112 on the surface 116 of first filter element 110. A second beam path 102 extends in the z-direction towards second location 114 on surface 116. A third beam path 103 extends in the y-direction towards second location 114 on the surface 118 of first filter element 110. A fourth beam path 104 extends in the y-direction towards first location 112 on surface 118.

Figure 1E:
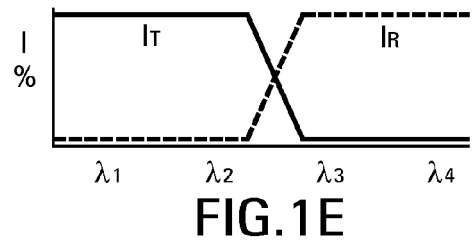
FIGS. 1E and 1F are graphs illustrating the transmission and reflection characteristics of the first and second filter elements of the multiplexer/demultiplexer shown in FIGS. 1A-1C.
Figure 1F:
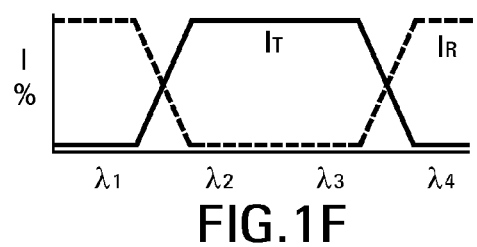

Light beams L1-L4 may be assigned to beam paths 101-104 in any order of wavelength. However, certain orders of wavelength assignment would require second filter element 130 to have a double bandpass characteristic. Although it is possible to design and fabricate a filter element having a double-bandpass characteristic, such design is not trivial and such fabrication can be complex and expensive. Accordingly, in embodiments of the invention, first filter element 110 and second filter element 130 have respective transmission characteristics no more complex than a single band-pass characteristic or a single band-stop characteristic. In multiplexer 100 described above with reference to FIGS. 1A-1D and in the alternative examples described below, one of first filter element 110 and second filter element 130 has a band-pass or a band-stop transmission characteristic and the other has a short-pass or a long-pass transmission characteristic as will be described below with reference to FIGS. 1E and 1F. As noted above, the reflection characteristic of each filter element is complementary to its transmission characteristic.

A transmission characteristic that is no more complex than a band-pass or a band-stop characteristic is characterized by no more than one cut-on wavelength and no more than one cut-off wavelength. A cut-on wavelength is the wavelength at which the transmissivity is equal to 50% of maximum as the filter characteristic transitions from a low transmissivity to a high transmissivity. A cut-off wavelength is the wavelength at which the transmissivity is equal to 50% of maximum as the filter characteristic transitions from a high transmissivity to a low transmissivity. A short-pass or a long-pass transmission characteristic is characterized by no more than one cut-on or cut-off wavelength, and is therefore no more complex than a band-pass or a band-stop characteristic.

The transmission characteristics of first filter element 110 and second filter element 130 can be made no more complex than a band-pass or a band-stop characteristic by assigning light beams L1-L4 in order of increasing wavelength to the above-described beam paths 101-104 in a circular order. In a circular order of the beam paths, beam path 102 follows beam path 101, beam path 103 follows beam path 102, beam path 104 follows beam path 103, and beam path 101 follows beam path 104. Alternatively, light beams L1-L4 are assigned in order of decreasing wavelength to beam paths 101-104 in the circular order just described, i.e., light beams L4, L3, L2 and L1 are assigned to beam paths 101, 102, 103 and 104, respectively.

In the example shown in FIGS. 1A-1D, light beams L1-L4 are in order of increasing wavelength and light beam L1 is assigned to beam path 101, light beam L2 is assigned to beam path 102, light beam L3 is assigned to beam path 103, light beam L4 is assigned to beam path 104. With this arrangement of the light beams, first filter element 110 has a short-pass transmission characteristic so that first filter element 110 transmits the shorter-wavelength light beams L1 and L2 and reflects longer-wavelength light beams L3 and L4. The short-pass transmission characteristic of first filter element 110 is indicated by a solid line in FIG. 1E. The complementary reflection characteristic of first filter element 110 is indicated by a broken line in the same figure. Also with this arrangement of the light beams, second filter element 130 has a band-pass transmission characteristic so that second filter element 130 transmits the intermediate-wavelength light beams L2 and L3 and reflects the shortest-wavelength light beam L1 and the longest-wavelength light beam L4. The band-pass transmission characteristic of second filter element 130 is indicated by a solid line in FIG. 1F. The complementary reflection characteristic of second filter element 130 is indicated by a broken line in the FIG. 1F. Moreover, first filter element 110 has a long-pass transmission characteristic and second filter element 130 has a band-pass transmission characteristic in an example in which light beams L1-L4 are assigned in order of decreasing wavelength to beam paths 101-104 in the above-described circular order, i.e., L4 to 101, L3 to 102, L2 to 103 and L1 to 104.

TABLE 1

| Beam Path 101 | Beam Path 102 | Beam Path 103 | Beam Path 104 | Transmission Characteristic of First Filter Element 110 | Transmission Characteristic of Second Filter Element 130 |
|---|---|---|---|---|---|
| L1 | L2 | L3 | L4 | short-pass | band-pass |
| L2 | L3 | L4 | L1 | band-pass | long-pass |
| L3 | L4 | L1 | L2 | long-pass | band-stop |
| L4 | L1 | L2 | L3 | band-stop | short-pass |
| L1 | L4 | L3 | L2 | band-stop | long-pass |
| L2 | L1 | L4 | L3 | short-pass | band-stop |
| L3 | L2 | L1 | L4 | band-pass | short-pass |
| L4 | L3 | L2 | L1 | long-pass | band-pass |

In other possible assignments of the light beams L1-L4 to beam paths 101-104 that result in first filter element 110 and second filter element 130 having transmission characteristics no more complex than a band-pass or band-stop characteristic, shortest-wavelength light beam L1 is assigned to any one of beam paths 101-104 and the remaining light beams are assigned in order of increasing wavelength or in order of decreasing wavelength to the remaining beam paths in the circular order just described. Table 1 shows the transmission characteristics of first filter element 110 and second filter element 130 in the example of multiplexer 100 shown in FIGS. 1A-1C for the assignments of light beams L1-L4 to beam paths 101-104 that allow first filter element 110 and second filter element 130 to have a transmission characteristic no more complex than a band-pass or a band-stop characteristic. The first four rows of the table show the light beams assigned to the beam paths in order of increasing wavelength, and last four rows of the table show the light beams assigned to the beam paths in order of decreasing wavelength.

In examples in which the proportional wavelength spacing of light beams L1-L4 is uniform, the eight assignments of light beams L1-L4 to beam paths 101-104 shown in Table 1 are equally valid. The proportional wavelength spacing between two light beams having adjacent wavelengths $\lambda_1$ and $\lambda_2$ is the quotient of the difference between the wavelengths and the sum of the wavelengths, i.e., $(\lambda_1-\lambda_2)/(\lambda_1+\lambda_2)$. In applications in which the light beams have non-uniform proportional wavelength spacings, designing and fabricating of the filter elements and additional filter elements is made easier by imposing additional constraints on the allocation of the light beams to the beam paths. Such additional constraints will be described below with reference to FIGS. 15A-15D.

In the example of multiplexer 100 described above with reference to FIGS. 1A-1D, light beams are incident on first filter element 110, second filter element 130 and reflector 140 at locations in the same x-z plane. A multiplexer in which light beams are incident on the first filter element, the second filter element and the reflector at locations in the same x-z plane will be referred to in this disclosure as having an X-Z configuration. FIGS. 2A-2D are respectively a plan view, a front view, an isometric view and a partial plan view showing another example of multiplexer 100 in accordance with an embodiment of the invention. In this example, relative to the example described above with reference to FIGS. 1A-1D, first filter element 110 is rotated through 180° about an axis parallel to the x-direction, second filter element 130 and reflector 140 are rotated through 90° about an axis extending in the x-direction and are offset from first filter element 110 in the y-direction. In this configuration, light beams are incident on first filter element 110, second filter element 130 and reflector 140 at locations in the same x-y plane. A multiplexer in which light beams are incident on the first filter element, the second filter element and the reflector at locations in the same x-y plane will be referred to in this disclosure as having an X-Y configuration.

Figure 2A:
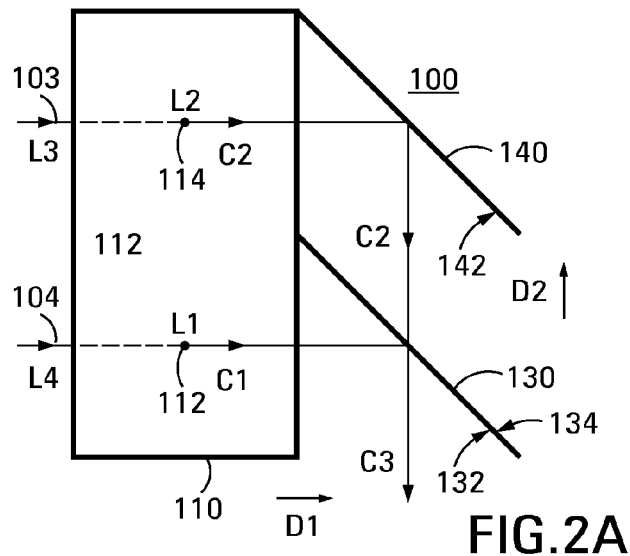
FIGS. 2A-2C are respectively a plan view, a front view and an isometric view showing another example of the optical wavelength multiplexer/demultiplexer shown in FIGS. 1A-1C. In this example, which will be described as having an X-Y configuration, the locations at which light beams are incident on the various elements of the multiplexer all lie in an x-y plane.
Figure 2D:
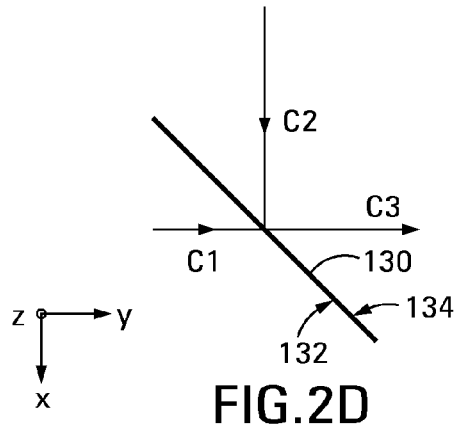
FIG. 2D is plan view of part of the multiplexer/demultiplexer shown in FIGS. 2A-2C in which the second filter element has a different transmission characteristic.
Figure 2B:
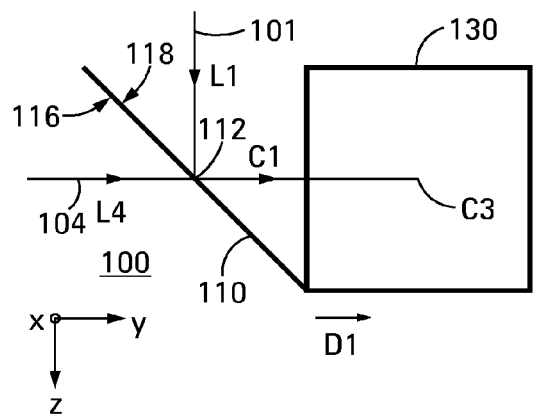
Figure 2C:
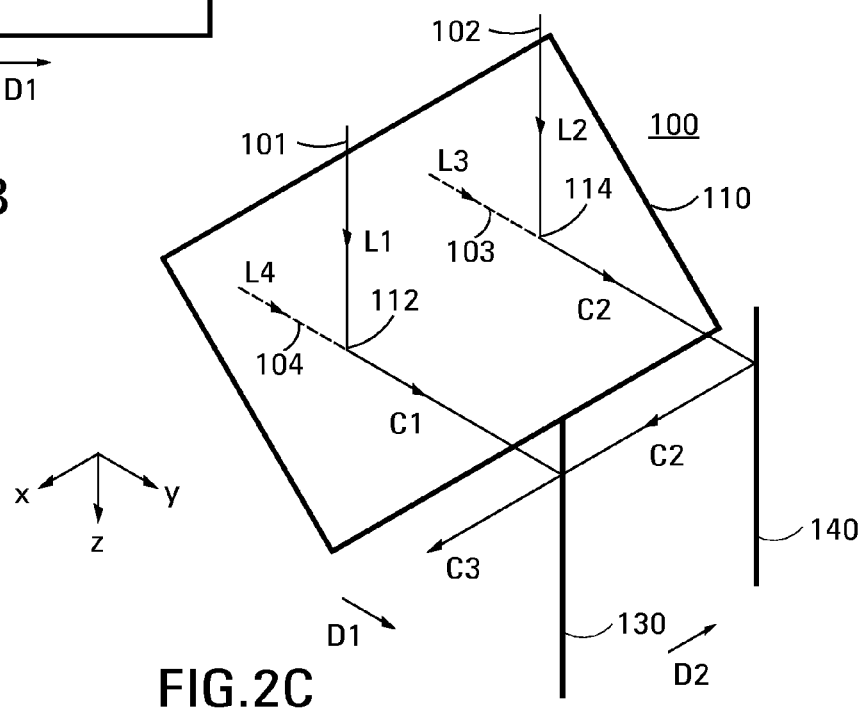
Figures 5A, 5B:
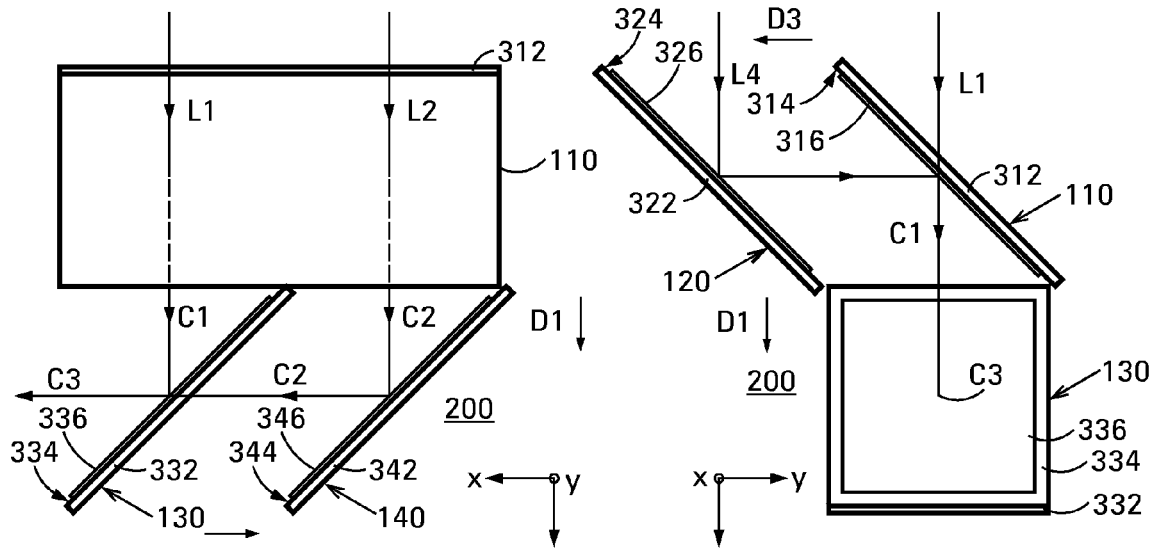
FIGS. 5A and 5B are respectively a side view and a front view showing an example of the optical wavelength multiplexer/demultiplexer shown in FIGS. 3A-3C in which each filter element is composed of a dichroic filter supported by a respective transparent wafer.
Figure 5C:
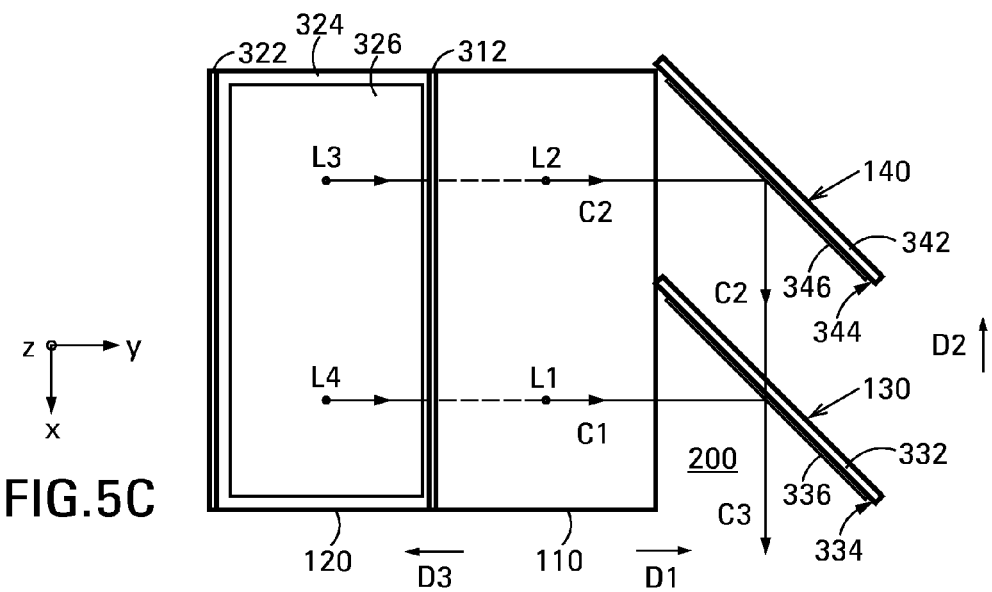
FIGS. 5C and 5D are respectively a plan view and a front view showing an example of the optical wavelength multiplexer/demultiplexer shown in FIGS. 4A-4C in which each filter element is composed of a dichroic filter supported by a respective transparent wafer.
Figure 5D:
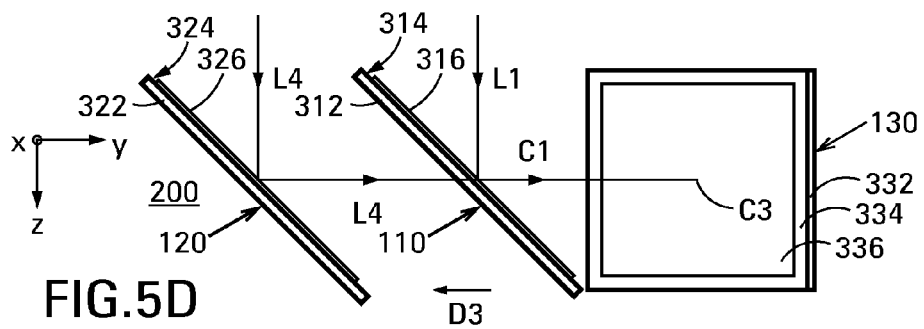
Figures 6A, 6B:
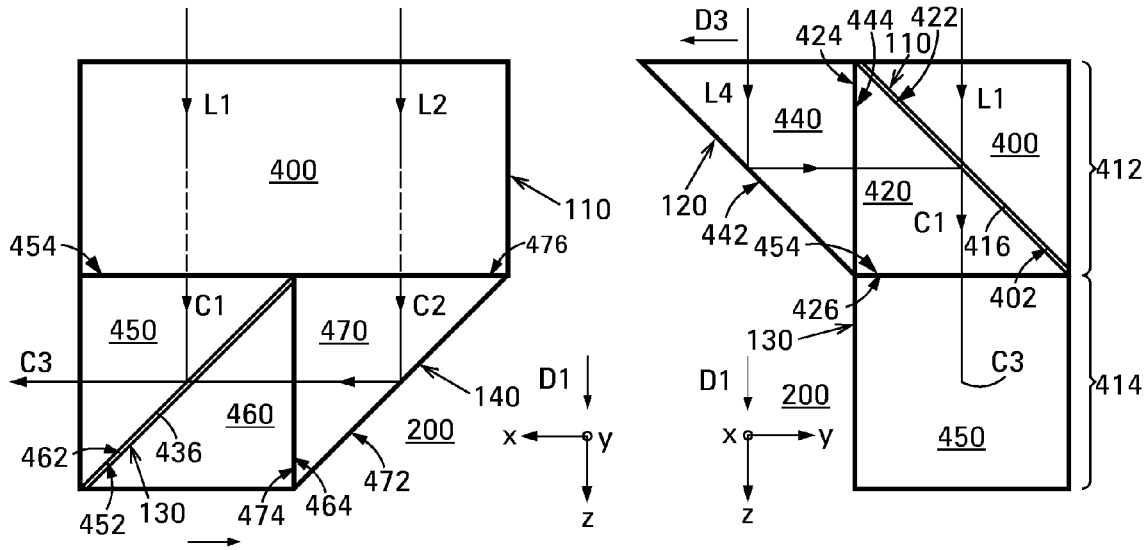
FIGS. 6A and 6B are respectively a side view and a front view showing an example of the optical wavelength multiplexer/demultiplexer shown in FIGS. 3A-3C in which each filter element is composed of a dichroic filter located between two triangular prisms.
Figure 6C:
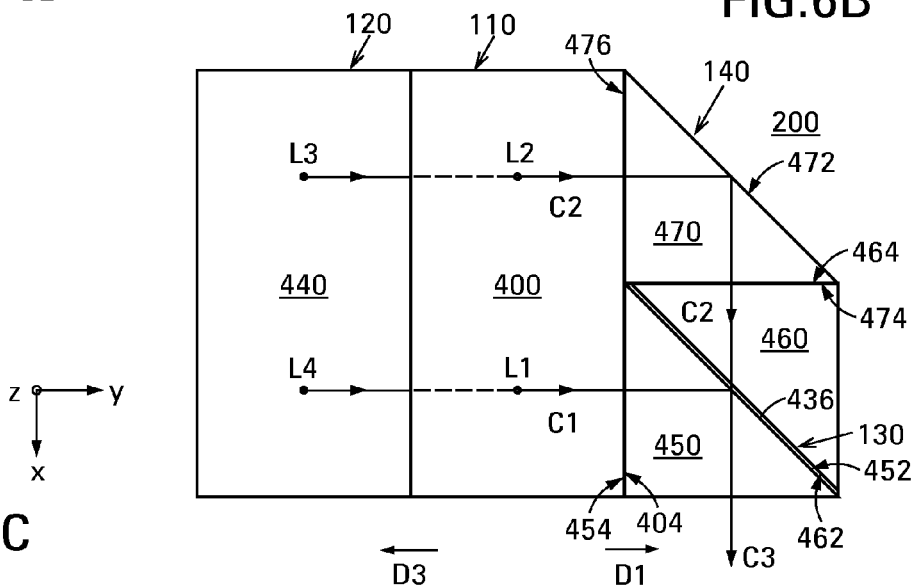
FIGS. 6C and 6D are respectively a plan view and a front view showing an example of the optical wavelength multiplexer/demultiplexer shown in FIGS. 4A-4C in which each filter element is composed of a dichroic filter located between two triangular prisms.
Figure 6D:
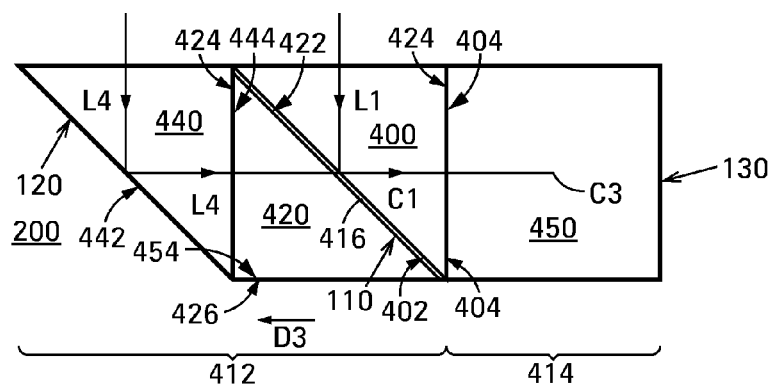
Figures 7A, 7B:
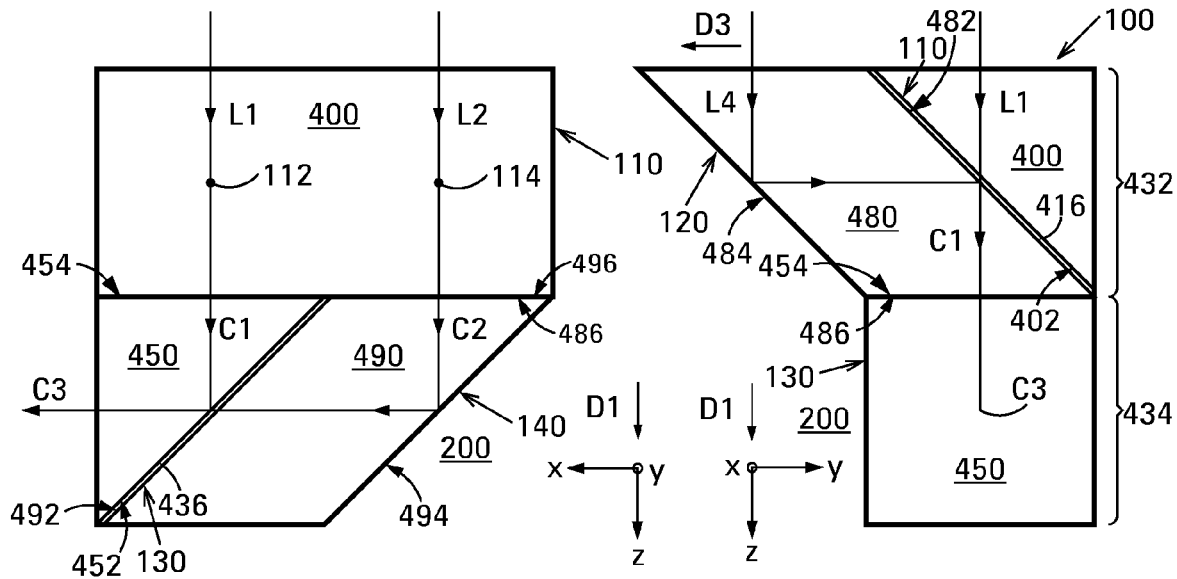
FIGS. 7A and 7B are respectively a side view and a front view showing an example of the optical wavelength multiplexer/demultiplexer shown in FIGS. 3A-3C in which each filter element is composed of a dichroic filter located between a rhomboidal prism and another prism.
Figure 7C:
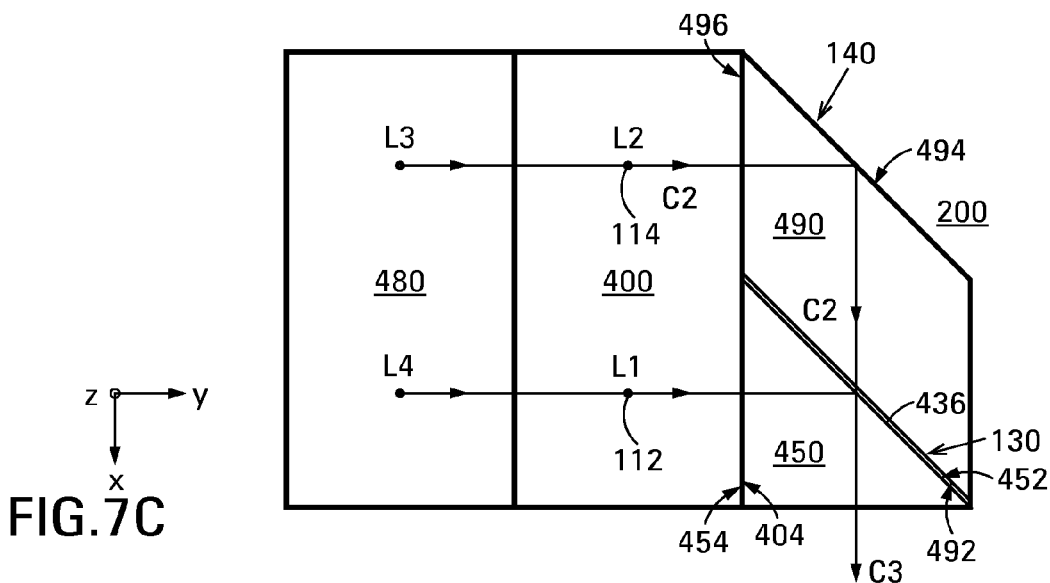
FIGS. 7C and 7D are respectively a plan view and a front view showing an example of the optical wavelength multiplexer/demultiplexer shown in FIGS. 4A-4C in which each filter element is composed of a dichroic filter located between a rhomboidal prism and another prism.
Figure 7D:
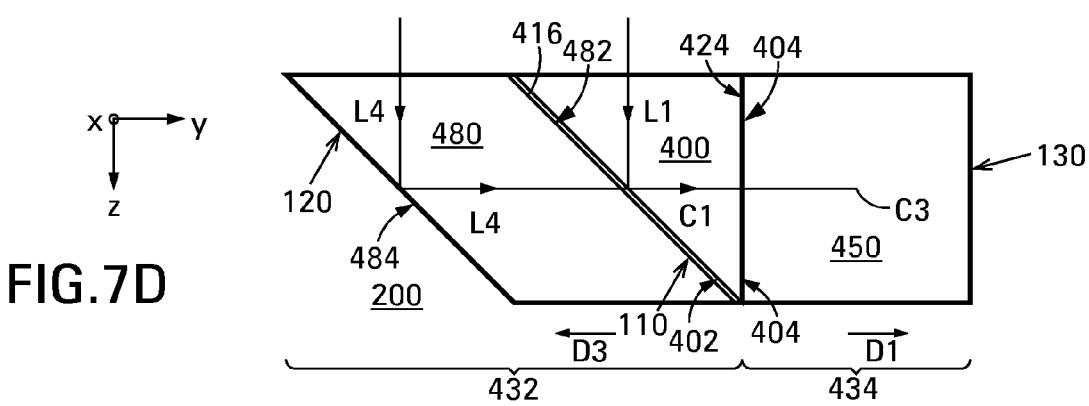

Referring now to FIGS. 2A-2C, it should be noted that FIG. 2A is a plan view, whereas FIG. 1A is a side view. Multiplexer 100 is composed of a planar first filter element 110, a planar second filter element 130 and a planar reflector 140. Second filter element 130 is offset from the first filter element in a first direction D1 to receive light reflected and transmitted from a first location 112 on first filter element 110. Second filter element 130 and first filter element 110 have orthogonal surface normals (not shown). Reflector 140 is parallel to second filter element 130 and is offset from the second filter element in a second direction D2 to receive light reflected and transmitted from a second location 114 on first filter element 110. Second direction D2 is orthogonal to first direction D1. Second location 114 is offset from first location 112 in second direction D2.

In multiplexer 100, each of first filter element 110 and second filter element 130 is configured to transmit light and to reflect light in respective non-overlapping wavelength ranges. Additionally, one of first filter element 110 and second filter element 130 has either a band-pass transmission characteristic or a band-stop transmission characteristic, and the other of first filter element 110 and second filter element 130 has either a short-pass or a long-pass transmission characteristic.

Light beams L1, L2, L3 and L4 having mutually-different wavelengths are respectively incident on first filter element 110. Light beam L1 and light beam L2 are incident at first location 112 and second location 114, respectively, on first filter element 110. First location 112 is aligned with second filter element 130 and second location 114 is aligned with reflector 140. The wavelengths of light beams L1 and L2 are within the one or more wavelength ranges reflected by first filter element 110. Consequently, first filter element 110 reflects light beam L1 and light beam L2 towards second filter element 130 and reflector 140, respectively. Light beam L3 and light beam L4 are incident at the second location 114 and the first location 112, respectively, on first filter element 110. The wavelengths of light beams L3 and L4 are within the one or more wavelength ranges transmitted by first filter element 110. Consequently, first filter element 110 transmits light beam L3 and light beam L4 towards reflector 140 and second filter element 130, respectively. First filter element 110, second filter element 130, reflector 140, first location 112 and second location 114 are arranged such that multiplexer 100 outputs light beams L1 through L4 as a single combined beam C3.

The exemplary multiplexer 100 will now be described in more detail with reference to FIGS. 2A-2C in which three, mutually-orthogonal directions, namely, an x-direction, a y-direction and a z-direction are additionally shown. In the example of multiplexer 100 shown, planar first filter element 110 has a plane surface 116 oriented at 45° relative to the x-y plane, a plane surface 118 opposite and parallel to surface 116, and has a normal (not shown) parallel to the y-z plane. Each of second filter element 130 and reflector 140 has a plane surface oriented at −45° relative to the y-z plane, and has a normal (not shown) parallel to the x-y plane. Second filter element 130 and reflector 140 are offset from first filter element 110 in the y-direction. Reflector 140 is offset from second filter element 130 in the −x-direction. Second location 114 is offset from first location 112 in the −x-direction by a distance equal to the offset of reflector 140 from second filter element 130.

Light beams L1 and L2 travel in the z-direction and are incident at first location 112 and second location 114, respectively, on surface 118 of first filter element 110. Surface 118 faces towards second filter element 130 and reflector 140. Each of light beams L1 and L2 has a nominal angle of incidence of 45° on surface 118. First filter element 110 is reflective at the wavelengths of light beams L1 and L2 and therefore reflects light beams L1 and L2 towards second filter element 130 and reflector 140, respectively.

Light beams L4 and L3 travel in the y-direction and are incident at first location 112 and second location 114, respectively, on the surface 116 of first filter element 110. Surface 116 is opposite surface 118, and therefore faces away from second filter element 130 and reflector 140. Each of light beams L4 and L3 has an angle of incidence of 45° on surface 116. First filter element 110 is transmissive at the wavelengths of light beams L4 and L3 and therefore transmits light beams L4 and L3 towards surface 118. Light beam L4 emerges from surface 118 and combines with light beam L1 reflected by first filter element 110 to form a combined beam C1 that travels in the y-direction towards second filter element 130. Light beam L3 emerges from surface 118 and combines with light beam L2 reflected by first filter element 110 to form a combined beam C2 that travels in the y-direction towards reflector 140.

Combined beam C1 travels in the y-direction and is incident on a surface 132 of second filter element 130 at an angle of incidence of 45°. Surface 132 faces away from reflector 140. Second filter element 130 is reflective at the wavelengths of light beams L1 and L4 constituting combined beam C1 and therefore reflects combined beam C1 in the x-direction.

Combined beam C2 travels in the y-direction and is incident on a surface 142 of reflector 140 at an angle of incidence of 45°. In the example shown, reflector 140 has a high reflectivity over a broad range of wavelengths, including the wavelengths of light beams L2 and L3. In other examples, reflector 140 has a wavelength-dependent reflectivity, as described above.

Reflector 140 reflects combined beam C2 at an angle of reflection of 45°. After reflection, combined beam C2 travels in the x-direction towards surface 134 of second filter element 130. Surface 134 is opposite surface 132 of second filter element 130 and faces reflector 140. Combined beam C2 is incident on surface 134 of second filter element 130 at a location opposite that on surface 132 where combined beam C1 is incident. Second filter element 130 is transmissive at the wavelengths of light beams L2 and L3 constituting combined beam C2, and therefore transmits combined beam C2 towards surface 132. Combined beam C2 emerges from surface 132 and combines with combined beam C1 reflected by second filter element 130 to form a combined beam C3. Combined beam C3 travels in the x-direction and is output from multiplexer 100.

In another example illustrated in a partial plan view shown in FIG. 2D, second filter element 130 is transmissive at the wavelengths of light beams L1 and L4 constituting combined beam C1, and is reflective at the wavelengths of light beams L2 and L3 constituting combined beam C2. Second filter element 130 therefore reflects combined beam C2 incident in the y-direction on surface 134, and transmits combined beam C1 incident on surface 132 towards surface 134. Combined beam C1 emerges from surface 134 to form combined beam C3 with combined beam C2 reflected by second filter element 130. Combined beam C3 travels in the y-direction and is output from multiplexer 100.

In the example shown in FIGS. 2A-2C, a first beam path 101 extends in the z-direction towards first location 112 on the surface 118 of first filter element 110. A second beam path 102 extends in the z-direction towards second location 114 on surface 118. A third beam path 103 extends in the y-direction towards second location 114 on the surface 116 of first filter element 110. A fourth beam path 104 extends in the y-direction towards first location 112 on surface 116.

As noted above, light beams L1-L4 may be assigned to beam paths 101-104 in any order of wavelength, but the design and fabrication of first filter element 110 and second filter element 130 are simplified by assigning the light beams to the beam paths in accordance with the rules set forth above with reference to FIGS. 1A-1C. In the example shown in FIGS. 2A-2C, light beams L1-L4 are assigned in order of increasing wavelength to beam paths 101-104, respectively.

Table 2 shows the transmission characteristics of first filter element 110 and second filter element 130 of the example shown in FIGS. 2A-2C for the assignments of light beams L1-L4 to beam paths 101-104 that allow first filter element 110 and second filter element 130 to have a transmission characteristic no more complex than a band-pass or a band-stop characteristic. The first four rows of the table show the light beams assigned in order of increasing wavelength to the beam paths in the above-described circular order, and last four rows of the table show the light beams assigned in order of decreasing wavelength to the beam paths in the circular order.

TABLE 2

| Beam Path 101 | Beam Path 102 | Beam Path 103 | Beam Path 104 | Transmission Characteristic of First Filter Element 110 | Transmission Characteristic of Second Filter Element 130 |
|---|---|---|---|---|---|
| L1 | L2 | L3 | L4 | long-pass | band-pass |
| L2 | L3 | L4 | L1 | band-stop | long-pass |
| L3 | L4 | L1 | L2 | short-pass | band-stop |
| L4 | L1 | L2 | L3 | band-pass | short-pass |
| L1 | L4 | L3 | L2 | band-pass | long-pass |
| L2 | L1 | L4 | L3 | long-pass | band-stop |
| L3 | L2 | L1 | L4 | band-stop | short-pass |
| L4 | L3 | L2 | L1 | short-pass | band-pass |

In some applications, it is more convenient for light beams L1-L4 to have a common direction of incidence on the multiplexer. FIGS. 3A-3D are respectively a side view, a front view, an isometric view and a partial side view showing an example of an X-Z configuration of an optical wavelength multiplexer/demultiplexer 200 in accordance with an embodiment of the invention in which the light beams have a common direction of incidence. For brevity, optical wavelength multiplexer/demultiplexer 200 will be referred to below as multiplexer 200 on the understanding that multiplexer 200 can additionally function as an optical demultiplexer simply by reversing the direction in which light travels through it. FIGS. 4A-4D are respectively a plan view, a front view, an isometric view and a partial plan view showing an example of an X-Y configuration of multiplexer 200. In FIGS. 3A-3D and 4A-4D, elements corresponding to those in FIGS. 1A-1D and FIGS. 2A-2D are indicated using the same reference numerals and will not be described again here.

Referring to FIGS. 3A-3D and FIGS. 4A-4D, multiplexer 200 is composed of a planar first filter element 110, a planar first reflector 120, a planar second filter element 130 and a planar second reflector 140. First reflector 120 is parallel to first filter element 110 and offset from the first filter element in a third direction D3. Second filter element 130 is offset from first filter element 110 in a first direction D1 to receive light reflected and transmitted from a first location 112 on first filter element 110. Second filter element 130 and first filter element 110 have orthogonal surface normals (not shown). Second reflector 140 is parallel to second filter element 130 and is offset from the second filter element in a second direction D2, orthogonal to first direction D1 and third direction D3, to receive light reflected and transmitted from a second location 114 on first filter element 110. In the example shown in FIGS. 3A-3D, first direction D1 is orthogonal to third direction D3. In the example shown in FIGS. 4A-4D, first direction D1 is opposite third direction D3.

In multiplexer 200, each of first filter element 110 and second filter element 130 is configured to transmit light and to reflect light in respective non-overlapping wavelength ranges. At least one of first filter element 110 and second filter element 130 has either a band-pass transmission characteristic or a band-stop transmission characteristic.

In the examples of multiplexer 200 shown in FIGS. 3A-3D and 4A-4D, light beams L1, L2, L3 and L4 having mutually-different wavelengths are respectively incident on multiplexer 200. Light beams L1 and L2 are incident at first location 112 and second location 114, respectively on first filter element 110. First location 112 is aligned with second filter element 130 and second location 114 is aligned with reflector 140. Light beam L3 and light beam L4 are incident on first reflector 120 and are reflected by the first reflector towards second location 114 and first location 112, respectively, on first filter element 110.

In the example shown in FIGS. 3A-3C, the wavelengths of light beams L1 and L2 are within the one or more wavelength ranges transmitted by first filter element 110. Consequently, first filter element 110 transmits light beam L1 and light beam L2 towards second filter element 130 and reflector 140, respectively. The wavelengths of light beams L3 and L4 received from first reflector 120 are within the one or more wavelength ranges reflected by first filter element 110. Consequently, first filter element 110 reflects light beam L3 and light beam L4 towards reflector 140 and second filter element 130, respectively. Light beam L1 transmitted by first filter element 110 combines with light beam L4 reflected by first filter element 110 to form a combined beam C1 that travels in the z-direction towards second filter element 130. Light beam L2 transmitted by first filter element 110 combines with light beam L3 reflected by first filter element 110 to form a combined beam C2 that travels in the z-direction towards second reflector 140. Second reflector 140 reflects combined beam C2 in the x-direction towards the location on second filter element 130 at which combined beam C1 is incident. In the example shown in FIGS. 3A-3C, combined beam C1 reflected by second filter element 130 combines with combined beam C2 transmitted by second filter element 130 to form a combined beam C3. In the example shown in FIG. 3D, combined beam C1 transmitted by second filter element 130 combines with combined beam C2 reflected by second filter element 130 to form combined beam C3.

In the example shown in FIGS. 4A-4C, the wavelengths of light beams L1 and L2 are within the one or more wavelength ranges reflected by first filter element 110. Consequently, first filter element 110 reflects light beam L1 and light beam L2 towards second filter element 130 and reflector 140, respectively. The wavelengths of light beams L3 and L4 received from first reflector 120 are within the one or more wavelength ranges transmitted by first filter element 110. Consequently, first filter element 110 transmits light beam L3 and light beam L4 towards reflector 140 and second filter element 130, respectively. Light beam L1 reflected by first filter element 110 combines with light beam L4 transmitted by first filter element 110 to form a combined beam C1 that travels in the y-direction towards second filter element 130. Light beam L2 reflected by first filter element 110 combines with light beam L3 transmitted by first filter element 110 to form a combined beam C2 that travels in the y-direction towards second reflector 140. Second reflector 140 reflects combined beam C2 in the x-direction towards the location on second filter element 130 at which combined beam C1 is incident. In the example shown in FIGS. 4A-4C, combined beam C1 reflected by second filter element 130 combines with combined beam C2 transmitted by second filter element 130 to form a combined beam C3. In the example shown in FIG. 4D, combined beam C1 transmitted by second filter element 130 combines with combined beam C2 reflected by second filter element 130 to form combined beam C3.

In multiplexer 200, first filter element 110, first reflector 120, second filter element 130, first reflector 140, first location 112 and second location 114 are arranged such that multiplexer 200 outputs light beams L1 through L4 as a single combined beam C3.

Much of the detailed description of the examples of multiplexer 100 shown in FIGS. 1A-1F and 2A-2D applies to the examples of multiplexer 200 shown in FIGS. 3A-3D and 4A-4D, respectively. Additionally, in both examples of multiplexer 200, first reflector 120 has a plane surface 126 oriented at 45° relative to the x-y plane and has a normal (not shown) parallel to the y-z plane. Light beams L4 and L3 travelling in the z-direction, parallel to the direction of travel of light beams L1 and L2, are incident on surface 126 each at an angle of incidence of 45°. After reflection, light beams L4 and L3 travel in the y-direction towards locations 112 and 114, respectively, on first filter element 110 in a manner similar to light beams L4 and L3 in the above-described examples of multiplexer 100.

In the examples shown in FIGS. 3A-3D and 4A-4D, a first beam path 101 extends in the z-direction towards first location 112 on first filter element 110. A second beam path 102 extends in the z-direction towards second location 114 on first filter element 110. A third beam path 103 extends in the z-direction towards first reflector 120, and is located and oriented such that, after reflection by the first reflector, light incident along beam path 103 is incident at second location 114 on first filter element 110. A fourth beam path 104 extends in the z-direction towards first reflector 120, and is located and oriented such that, after reflection by the first reflector, light incident along beam path 104 is incident at first location 112 on first filter element 110.

Light beams L1-L4 may be assigned to beam paths 101-104 in any order of wavelength, but the design and fabrication of first filter element 110 and second filter element 130 are simplified by assigning the light beams to the beam paths in accordance with the rules described above with reference to FIGS. 1A-1C. In the examples of multiplexer 200 shown in FIGS. 3A-3D and 4A-4D, light beams L1-L4 are assigned in order of increasing wavelength or in order of decreasing wavelength to beam paths 101-104, respectively. Table 1 above shows the transmission characteristics of first filter element 110 and second filter element 130 of the example shown in FIGS. 3A-3C for the assignments of light beams L1-L4 to beam paths 101-104 that allow first filter element 110 and second filter element 130 to have a transmission characteristic no more complex than a band-pass or band-stop characteristic. Table 2 above shows the transmission characteristics of first filter element 110 and second filter element 130 of the example shown in FIGS. 4A-4C for the assignments of light beams L1-L4 to beam paths 101-104 that that allow first filter element 110 and second filter element 130 to have a transmission characteristic no more complex than a band-pass or band-stop characteristic.

FIGS. 5A and 5B and FIGS. 5C and 5D show examples of the construction of the X-Z and X-Y configurations of multiplexer 200 described above with reference to FIGS. 3A-3D and FIGS. 4A-4D, respectively. A similar construction may be used in embodiments of multiplexer 100 described above with reference to FIGS. 1A-1D and 2A-2D except that multiplexer 100 has only one reflector, i.e., reflector 140.

Referring to FIGS. 5A-5D, first filter element 110 is composed of a transparent substrate 312 having a major surface 314 on which is located a dichroic filter 316. First reflector 120 is composed of a substrate 322 having a major surface 324 on which is located a reflective element 326. Second filter element 130 is composed of a substrate 332 having a major surface 334 on which is located a dichroic filter 336. Second reflector 140 is composed of a substrate 342 having a major surface 344 on which is located a reflective element 346. Optionally, an antireflective coating may be applied to substrates 312 and 332 on the major surfaces opposite major surfaces 314 and 334, respectively, to reduce losses due to reflection at these surfaces.

Substrates 312, 322, 332 and 342 are typically a thin wafer of glass or quartz. Other substrate materials can alternatively be used.

Each dichroic filter 316, 336 is an optical interference filter composed of multiple thin layers (not shown) of different dielectric materials of different thicknesses. The number of layers and the material and thickness of each layer are designed with regard to the wavelengths of light beams L1-L4 to provide each filter element with the transmission and reflection characteristics described above, i.e., to make each filter element highly reflective at the wavelengths of two of the light beams and highly transmissive at the wavelengths of two of the light beams. One of dichroic filters 316, 336 has a band-pass or band-stop transmission characteristic, whereas the other of the dichroic filters has a short-pass or long-pass transmission characteristic. The dichroic filters have reflection characteristics complementary to their transmission characteristics.

Design processes, software implementing such design processes, and fabrication techniques for fabricating dichroic filters with a single band-pass, a single band-stop, a single short-pass or a single long-pass transmission characteristic with one or both of a cut-on and a cut-off at defined wavelengths are known in the art and will therefore not be described here.

Each reflective element 326, 346 is a reflective optical coating composed of multiple thin layers (not shown) of different dielectric materials of different thicknesses. The number of layers and the material and thickness of each layer are designed with regard to the wavelengths of light beams L1-L4 to make each reflective element highly reflective at least at the wavelengths of the light beams incident on the respective reflector.

Alternatively, each reflective element 326, 346 is composed of at least one layer of metal that is reflective at least at the wavelengths of the light beams incident on the respective reflector. In another alternative, one or both of first reflector 120 and second reflector 140 is composed exclusively of a piece of metal having a polished planar surface that is highly reflective at least at the wavelengths of the light beams incident on the respective reflector. A substrate is unnecessary with such construction. Alternatively, each reflective element 326, 346 can be structured to reflect using total internal reflection.

First filter element 110, first reflector 120, second filter element 130 and second reflector 140 constructed as just described are mounted in a suitable armature (not shown) that holds each of them in a defined position and orientation with respect to the others. In some examples, at least one of the various elements is adjustably mounted in the armature to allow its position and orientation to be optimized after installation of multiplexer 200 in its operating environment. Such adjustable mounts additionally allow periodic re-optimization of multiplexer 200 during its service life. The armature may additionally locate, e.g., lasers respectively generating light beams L1-L4, photodetectors respectively receiving light beams L1-L4, and optical elements that receive or provide combined beam C3, in defined positions and orientations with respect to multiplexer 200. In the examples shown in FIGS. 5A-5D, at least two of the lasers are offset from their nominal positions to compensate for refraction in the substrates of first filter element 110 and second filter element 130.

FIGS. 6A and 6B and FIGS. 6C and 6D show further examples of the construction of the X-Z and X-Y configurations of multiplexer 200 described above with reference to FIGS. 3A-3C and FIGS. 4A-4C, respectively. A similar construction may be used in embodiments of multiplexer 100 described above with reference to FIGS. 1A-1D and 2A-2D.

Referring to FIGS. 6A-6D, first filter element 110 is composed of a dichroic filter 416 located between a first triangular prism 400 and a second triangular prism 420. First reflector 120 is provided by a surface 442 of a triangular prism 440 at which total internal reflection takes place. Second filter element 130 is composed of a dichroic filter 436 located between a first triangular prism 450 and a second triangular prism 460. Second reflector 140 is provided by a surface 472 of a triangular prism 470 at which total internal reflection takes place. Each of the triangular prisms is a 90° isosceles triangular prism. Typically, the prisms all have the same dimensions.

Each dichroic filter 416, 436 is an optical interference filter composed of multiple thin layers (not shown) of different dielectric materials of different thicknesses, as described above with reference to FIGS. 5A-5D. In this embodiment, first filter element 110 is composed of dichroic filter 416 located between the hypotenuse surface 402 of triangular prism 400 and the hypotenuse surface 422 of triangular prism 420. Triangular prism 400, triangular prism 420 and dichroic filter 416 constitute part of a first filter element sub-assembly 412 that is additionally composed of triangular prism 440. Triangular prism 440 has an opposite surface 444 bonded to an opposite surface 424 of triangular prism 420 such that the hypotenuse surface 442 of triangular prism 440 is parallel to the hypotenuse surface 422 of triangular prism 420. Hypotenuse surface 442 provides first reflector 120 and is disposed accurately parallel to dichroic filter 416. A hypotenuse surface and an opposite surface of a triangular prism are the surfaces of the prism respectively opposite the largest angle and one of the smaller angles of the prism.

Second filter element 130 is composed of dichroic filter 436 located between the hypotenuse surface 452 of triangular prism 450 and the hypotenuse surface 462 of triangular prism 460. Triangular prism 450, triangular prism 460 and dichroic filter 436 constitute part of a second filter element sub-assembly 414 that is additionally composed of triangular prism 470. Triangular prism 470 has an opposite surface 474 bonded to an opposite surface 464 of triangular prism 460 such that the hypotenuse surface 472 of triangular prism 470 is parallel to the hypotenuse surface 462 of triangular prism 460. Hypotenuse surface 472 provides second reflector 140 and is disposed accurately parallel to dichroic filter 436.

First filter element 110 is fabricated by depositing the layers of dielectric material constituting dichroic filter 416 on the hypotenuse surface 402 of prism 400, or on the hypotenuse surface 422 of prism 420. The hypotenuse surface of the other of prisms 400, 420 is then bonded to dichroic filter 416 using a suitable adhesive. Adhesives suitable for this purpose are known in the art and will therefore not be described here. Alternatively, an adhesive-less bonding process, such as optical contacting or chemical bonding can be used. Second filter element 130 is fabricated in a similar manner.

First filter element sub-assembly 412 is fabricated by bonding opposite surface 424 of prism 420 to opposite surface 444 of prism 440 using an index-matching adhesive. Index-matching adhesives suitable for this purpose are known in the art and will therefore not be described here. Second filter element sub-assembly 414 is fabricated by bonding opposite surface 474 of prism 470 to opposite surface 464 of prism 460 using an index-matching adhesive. Alternatively, an adhesive-less bonding process may be used to fabricate these sub-assemblies.

Multiplexer 200 is then formed as a monolithic structure by bonding second filter element sub-assembly 414 to first filter element sub-assembly 412. In the example shown in FIGS. 6A and 6B, an opposite surface 454 of prism 450 and an opposite surface 476 of prism 470 are bonded to an opposite surface 426 of prism 420 to dispose second filter element 130 and reflector 140 opposite first filter element 110 with second filter element 130 orthogonal to first filter element 110, i.e., with the normal to dichroic filter 436 orthogonal to the normal to dichroic filter 416. In the example shown in FIGS. 6C and 6D, opposite surface 454 of prism 450 and an opposite surface 476 of prism 470 are bonded to an opposite surface 404 of prism 400 to dispose second filter element 130 and reflector 140 opposite first filter element 110 with second filter element 130 orthogonal to first filter element 110, i.e., with the normal to dichroic filter 436 orthogonal to the normal to dichroic filter 416. Index-matching adhesive or adhesive-less bonding may be used in both cases.

Additional elements, such as lasers respectively generating light beams L1-L4, photodetectors respectively receiving light beams L1-L4, and optical elements that receive or provide combined beam C3, may be affixed to the monolithic assembly constituting multiplexer 200. Such additional elements are affixed to external surfaces of the triangular prisms constituting multiplexer 200 in defined positions and orientations with respect to the filter elements and reflectors of multiplexer 200. Since light beams L1-L4 incident on first filter element 110 and first reflector 120 have a zero angle of incidence on the surfaces of prisms 400 and 420, respectively, through which they pass, there is no need to offset any of the lasers and photodetectors from their nominal positions to compensate for refraction at such surfaces.

Fabrication costs of the examples of multiplexer 200 shown in FIGS. 6A-6D can be reduced by depositing dichroic filter 416 on the hypotenuse surface of a long triangular prism and bonding the hypotenuse surface of another long triangular prism to the dichroic filter to form a multiple first filter element (not shown). An additional long triangular prism is bonded to the multiple first filter element to form a multiple first filter element sub-assembly (not shown). Each long triangular prism has an x-direction dimension that is a multiple of the x-direction dimension of triangular prisms 400, 420 and 440. The multiple first filter element sub-assembly is then divided by saw cuts extending in the y-direction to produce several first filter element sub-assemblies 412 each composed of a first filter element 110 and a first reflector 120. Second filter element sub-assemblies 414, each composed of second filter element 130 and second reflector 140, are fabricated in a similar manner. A first filter element sub-assembly 412 fabricated as just described is bonded to a second filter element sub-assembly 414 fabricated as just described to form multiplexer 200 as a monolithic structure.

A monolithic version of multiplexer 100 described above with reference to FIGS. 1A-1F and FIGS. 2A-2D can be constructed in a manner similar to that described above with reference to FIGS. 6A and 6B and FIGS. 6C and 6D except that prism 440 is omitted.

FIGS. 7A and 7B and FIGS. 7C and 7D show further examples of the construction of the X-Z and X-Y configurations of multiplexer 200 described above with reference to FIGS. 3A-3C and FIGS. 4A-4C, respectively. Referring to FIGS. 7A-7D, first filter element 110 is composed of a dichroic filter 416 located between the hypotenuse surface 402 of a triangular prism 400 and a first major surface 482 of a rhomboidal prism 480. A second major surface 484 of rhomboidal prism 480 parallel to first major surface 482 provides first reflector 120. Total internal reflection takes place at surface 484. The major surfaces and the minor surfaces of a rhomboidal prism are the surfaces of the prism opposite the obtuse and acute angles, respectively.

Second filter element 130 is composed of a dichroic filter 436 located between the hypotenuse surface 452 of a triangular prism 450 and a first major surface 492 of a rhomboidal prism 490. A second major surface 494 of rhomboidal prism 490 parallel to first major surface 492 provides second reflector 140. Total internal reflection takes place at surface 494. Each of rhomboidal prisms 480 and 490 has an acute angle of 45°. A rhomboidal prism (not shown) suitably truncated to provide a surface parallel to the x-y plane so that the surface is orthogonal to light beams L1 and L2 incident thereon may be substituted for triangular prism 400. Additionally or alternatively, a rhomboidal prism (not shown) suitably truncated to provide a surface parallel to the y-z plane so that the surface is orthogonal to combined beam C3 incident thereon may be substituted for triangular prism 450.

Each dichroic filter 416, 436 is an optical interference filter composed of multiple thin layers (not shown) of different dielectric materials of different thicknesses, as described above with reference to FIGS. 5A-5D. In the examples shown in FIGS. 7A-7D, a first filter element sub-assembly 432 composed of rhomboidal prism 480, prism 400 and dichroic filter 416 is fabricated by depositing the layers of dielectric material constituting dichroic filter 416 on the major surface 482 of rhomboidal prism 480. Since the opposed major surfaces 482 and 484 of rhomboidal prism 480 are accurately parallel, forming dichroic filter 416 on surface 482 automatically disposes first filter element 110 and first reflector 120 accurately parallel to one another. The hypotenuse surface of triangular prism 400 is then bonded to dichroic filter 416 using a suitable adhesive or adhesive-less bonding method.

A second filter element sub-assembly 434 composed of rhomboidal prism 490, prism 450 and dichroic filter 436 is fabricated in a similar way to first filter element sub-assembly 432. In second filter element sub-assembly 434, dichroic filter 436 is deposited on the first major surface 492 of rhomboidal prism 490, and the second major surface 494 of rhomboidal prism 490 provides second reflector 140. The hypotenuse surface 452 of triangular prism 450 is bonded to dichroic filter 436.

Second filter element sub-assembly 434 is bonded to first filter element sub-assembly 432 to form multiplexer 200 as a monolithic structure. In the example shown in FIGS. 7A and 7B, an opposite surface 454 of triangular prism 450 and a minor surface 496 of rhomboidal prism 490 are bonded to a minor surface 486 of rhomboidal prism 480 to dispose second filter element 130 and reflector 140 opposite first filter element 110 with second filter element 130 orthogonal to first filter element 110, i.e., with the normal to dichroic filter 436 orthogonal to the normal to dichroic filter 416. In the example shown in FIGS. 7C and 7D, an opposite surface 454 of triangular prism 450 and a minor surface 496 of rhomboidal prism 490 are bonded to an opposite surface 404 of prism 400 to dispose second filter element 130 and reflector 140 opposite first filter element 110 with second filter element 130 orthogonal to first filter element 110, i.e., with the normal to dichroic filter 436 orthogonal to the normal to dichroic filter 416. Index-matching adhesive or adhesiveless bonding may be used in both cases.

Additional elements, such as lasers respectively generating light beams L1-L4, photodiodes respectively receiving light beams L1-L4, and optical elements that receive or provide combined beam C3, may be affixed to the monolithic assembly constituting multiplexer 200. Such additional elements are affixed to the external surfaces of the prisms constituting multiplexer 200 in defined positions and orientations with respect to the filter elements and reflectors of multiplexer 200. Since light beams L1-L4 incident on first filter element 110 and first reflector 120 have a zero angle of incidence on the surfaces of prisms 400 and 480, respectively, through which they pass, there is no need to offset any of the lasers from their nominal positions to compensate for refraction at such surfaces.

Fabrication costs of the examples of multiplexer 200 shown in FIGS. 7A-7D can be reduced by depositing dichroic filter 416 on one major surface of a long rhomboidal prism and bonding the hypotenuse surface of a long triangular prism to the dichroic filter to form a multiple first filter element assembly (not shown). Each long prism has an x-direction dimension that is a multiple of the x-direction dimension of triangular prism 400 and rhomboidal prism 480. The multiple first filter element sub-assembly is then divided by saw cuts extending in the y-direction to produce several first filter element sub-assemblies 432 each composed of a first filter element 110 and a first reflector 120. Second filter element sub-assemblies 434, each composed of a second filter element 130 and a second reflector 140, can be fabricated in a similar manner. A first filter element sub-assembly 432 fabricated as just described is bonded to a second filter element sub-assembly 434 fabricated as just described to form multiplexer 200 as a monolithic structure.

Figure 8:
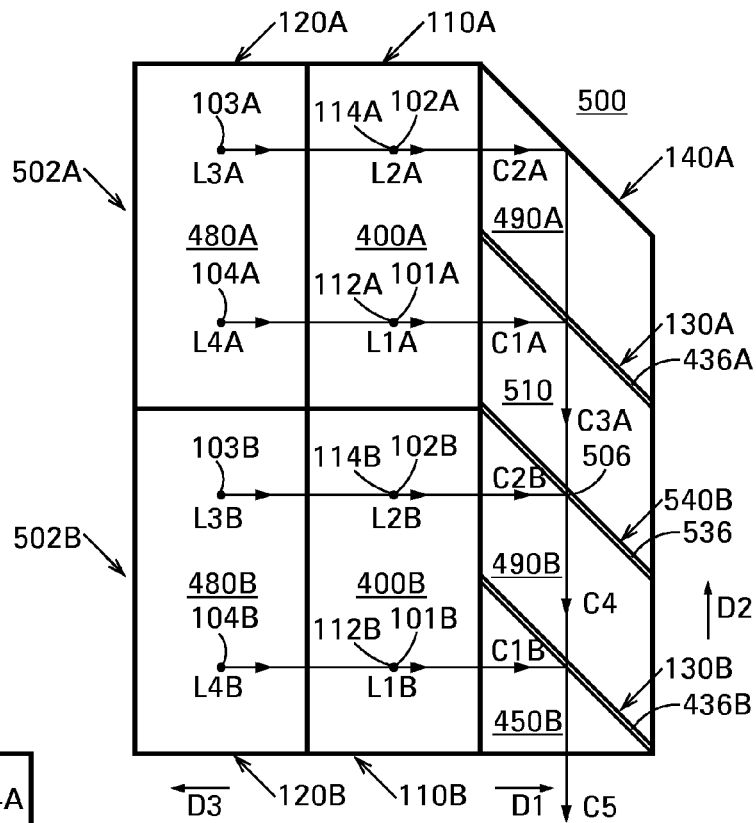
FIG. 8 is a plan view showing an example of the optical wavelength multiplexer/-demultiplexer in accordance with an embodiment of the invention in which two multiplexer modules based on the multiplexer shown in FIGS. 4A-4C are concatenated in a first way.

The above-described optical wavelength multiplexers/demultiplexers are modular and may be concatenated to form optical wavelength multiplexers/demultiplexers capable of combining an increased number of light beams into a single combined beam or splitting a combined beam into its constituent component light beams. FIG. 8 is a plan view showing an example of an eight-input optical wavelength multiplexer or eight-output optical wavelength demultiplexer 500 constructed by concatenating a first instance of multiplexer 200, which will be referred to as a multiplexer module 502A, and a second instance of multiplexer 200, which will be referred to as a multiplexer module 502B. Elements of multiplexer module 502A have the same reference numerals as the corresponding elements shown in FIGS. 4A-4C and FIGS. 7C and 7D with a letter A appended, whereas the elements of multiplexer module 502B have a letter B appended.

In the example shown in FIG. 8, multiplexer module 502A is composed of a planar first filter element 110A, a planar first reflector 120A, a planar second filter element 130A and a planar second reflector 140A. First reflector 120A is parallel to first filter element 110A and offset from the first filter element in a third direction D3. Second filter element 130A is offset from first filter element 110A in a first direction D1 to receive light reflected and transmitted from a first location 112A on first filter element 110A. Second filter element 130A and first filter element 110A have orthogonal surface normals. Second reflector 140A is parallel to second filter element 130A and is offset from the second filter element in a second direction D2, orthogonal to first direction D1 and third direction D3, to receive light reflected and transmitted from a second location 114A on first filter element 110A. Second location 114A is offset from first location 112A in the second direction.

Multiplexer module 502B is composed of a planar first filter element 110B, a planar first reflector 120B, a planar second filter element 130B and a planar second reflector 540B. First reflector 120B is parallel to first filter element 110B and offset from the first filter element in third direction D3. Second filter element 130B is offset from first filter element 110B in first direction D1 to receive light reflected and transmitted from a first location 112B on first filter element 110B. Second filter element 130B and first filter element 110 have orthogonal surface normals. Second reflector 540B is parallel to second filter element 130B, has a wavelength-dependent reflectivity, and is offset from second filter element 130B in second direction D2, orthogonal to first direction D1 and third direction D3, to receive light reflected and transmitted from a second location 114B on first filter element 110B. Second location 114B is offset from first location 112B in the second direction.

In the example shown in FIG. 8, each multiplexer module 502A, 502B has an X-Y configuration, as described above with reference to FIGS. 4A-4C. One or both of multiplexer modules 502A, 502B may alternatively have an X-Z configuration, as described above with reference to FIGS. 3A-3C. In the example shown in FIG. 8, each multiplexer module is constructed using rhomboidal prisms and triangular prisms, as described above with reference to FIGS. 7C and 7D. Each multiplexer module may alternatively be constructed using triangular prisms, as described above with reference to FIGS. 6A-6D, or using thin elements, as described above with reference to FIGS. 5A-5D, or in some other way.

Multiplexer module 502A is positioned relative to multiplexer module 502B such that combined beam C3A output by multiplexer module 502A is incident at the same location 506 on the second reflector 540B of multiplexer module 502B as that at which combined beam C2B is incident. This condition is achieved by disposing the second filter element 130A and second reflector 140A of multiplexer module 502A in tandem with, and parallel to, second reflector 540B of multiplexer module 502B.

Multiplexer module 502A is optically identical to multiplexer 200 described above with reference to FIGS. 4A-4C. Multiplexer module 502B differs from multiplexer 200 described above with reference to FIGS. 4A-4C in that second reflector 540B has a wavelength-dependent reflectivity such that second reflector 540B is transmissive in a range of wavelengths encompassing the wavelengths of light beams L1A-L4A incident on multiplexer module 502A and constituting combined beam C3A, and is reflective in a range of wavelengths encompassing the wavelengths of light beams L3B and L2B constituting combined beam C2B. Combined beam C3A transmitted by second reflector 540B combines with combined beam C2B reflected by second reflector 540B to form a combined beam C4 that travels in the x-direction and is incident on second filter element 130B. Combined beam C4 transmitted by second filter element 130B combines with combined beam C1B reflected by second filter element 130B to form a combined beam C5 that provides the output of multiplexer 500.

Although, light beams L1A-L4A incident on multiplexer module 502A may have any wavelength relationship to light beams L1B-L4B incident on multiplexer module 502B, the design and fabrication of second reflector 540B and second filter element 130B are simplified by imposing additional constraints on the allocation of the light beams to beam paths 101A-104A extending towards multiplexer module 502A and beam paths 101B-104B extending towards multiplexer module 502B. In one example, light beams L1A-L4A are assigned in order of increasing wavelength to beam paths 101A-104A, respectively, light beams L1B-L4B are assigned in order of increasing wavelength to beam paths 101B-104B, respectively, and light beams L1A-L4A are intermediate in wavelength between light beams L1B and L4B. This arrangement allows second reflector 130B to have a single band-pass transmission characteristic. Subject to the condition that light beams L1A-L4A be intermediate in wavelength between light beams L1B and L4B, light beams L1A-L4A may be (a) longer in wavelength than light beam L3B, (b) shorter in wavelength than light beam L2B, or (c) intermediate in wavelength between light beams L2B and L3B. In these cases, second reflector 540B has a long-pass, a short-pass, or a band-pass transmission characteristic, respectively. In another example, in which light beams L1A-L4A incident on multiplexer module 502A are all longer in wavelength than light beams L1B-L4B incident on multiplexer module 502B, light beams L1A-L4A are assigned in order of increasing wavelength to beam paths 101A-104A, respectively, and light beams L1B-L4B are assigned in order of increasing wavelength to beam paths 104B, 101B, 102B and 103B, respectively. In this case, reflector 540B and second filter element 130B each have a long-pass transmission characteristic. Alternatively, light beams L1A-L4A may all be shorter in wavelength than light beams L1B-L4B. In this case, reflector 540B has a short-pass transmission characteristic and second filter element 130B has band stop transmission characteristic.

Wavelength-dependent second reflector 540B can be embodied as a dichroic filter on a surface of a thin, transparent wafer in a manner similar to that described above with reference to FIGS. 5A-5D, as a dichroic filter located between two triangular prisms in a manner similar to that described above with reference to FIGS. 6A-6D, as a dichroic filter located between a rhomboidal prism and another prism in a manner similar to that described above with reference to FIGS. 7A-7D, or in some other suitable way.

In the example shown in FIG. 8, a dichroic filter 536 provides second reflector 540B with its wavelength-dependent reflectivity. Dichroic filter 536 is located between rhomboidal prism 490B and another rhomboidal prism 510. Specifically, dichroic filter 436B that constitutes part of the second filter element 130B is deposited on one major surface of rhomboidal prism 490B, and dichroic filter 536 is deposited on the other major surface of rhomboidal prism 490B opposite dichroic filter 436B. In multiplexer module 502A, a rhomboidal prism 510 is substituted for triangular prism 450 in the embodiment of multiplexer 200 described above with reference to FIGS. 7C and 7D. One major surface of rhomboidal prism 510 is bonded to the exposed surface of dichroic filter 436A on rhomboidal prism 490A, and the other major surface of rhomboidal prism 510 is bonded to the exposed surface of dichroic filter 536 on rhomboidal prism 490B. Alternatively, dichroic filter 536 is deposited on the major surface of prism 510 opposite the major surface of prism 510 juxtaposed with dichroic filter 436A, and the exposed surface of dichroic filter 536 is bonded to the major surface of rhomboidal prism 490B opposite the major surface on which dichroic filter 436B is deposited.

Figure 9A:
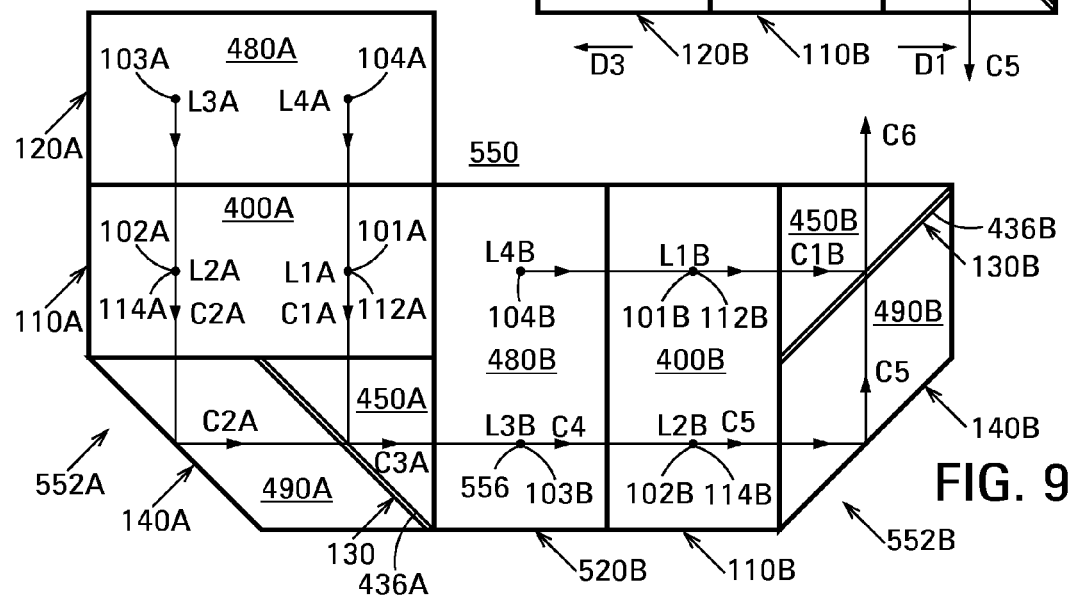
FIGS. 9A and 9B are respectively a plan view and a front view showing an example of the optical wavelength multiplexer/demultiplexer in accordance with an embodiment of the invention in which two multiplexer modules based on the multiplexer shown in FIGS. 4A-4C are concatenated in a second way.

In the example of multiplexer 500 shown in FIG. 8, combined beam C3A output by multiplexer module 502A is input to multiplexer module 502B via second reflector 540B, which has a wavelength-dependent reflectivity. The combined beam generated by one multiplexer module may alternatively be input to the other multiplexer module via the first reflector of the other multiplexer module. FIG. 9A is a plan view and FIG. 9B is a side view showing an example of an optical wavelength multiplexer/demultiplexer 550 in accordance with an embodiment of the invention in which, when operating as an optical multiplexer, combined beam C3A output by one multiplexer module is input to the other multiplexer module via the first reflector of the other multiplexer module, which has a wavelength-dependent reflectivity.

Figure 9B:
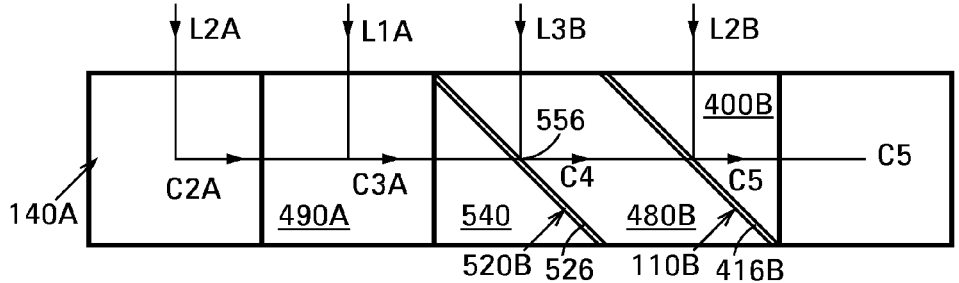

In FIGS. 9A and 9B, multiplexer 550 is composed of a multiplexer module 552A and a multiplexer module 552B. Multiplexer module 552A and multiplexer module 552B are similar in structure to multiplexer module 502A and multiplexer module 502B described above with reference to FIG. 8, but the first reflector of multiplexer module 552B has a wavelength-dependent reflectivity whereas the second reflector of multiplexer module 502B has the wavelength-dependent reflectivity. Multiplexer 550 may have alternative configurations and constructions similar to those described above with reference to FIG. 8.

Multiplexer module 552A is positioned relative to multiplexer module 552B such that combined beam C3A output by multiplexer module 552A is incident at the same location 556 on the first reflector 520B of multiplexer module 552B as that at which light beam L3B is incident. This condition is achieved by disposing the second filter element 130A and second reflector 140A of multiplexer module 552A in tandem with the first reflector 520B of multiplexer module 552B.

Multiplexer module 552A is optically identical to multiplexer 200 described above with reference to FIGS. 4A-4C. Multiplexer module 552B differs from multiplexer 200 described above with reference to FIGS. 4A-4C in that first reflector 520B has a wavelength-dependent reflectivity such that the first reflector reflects light beam L3B incident on multiplexer module 552B and transmits the combined beam C3A received from multiplexer module 552A.

Although light beams L1A-L4A incident on multiplexer module 552A may have any wavelength relationship to light beams L1B-L4B incident on multiplexer module 552B, the design and fabrication of first reflector 520B is simplified by imposing additional constraints on the allocation of the light beams to beam paths 101A-104A extending towards multiplexer module 552A and 101B-104B extending towards multiplexer module 552B. In an example, light beams L1A-L4A are assigned in order of increasing wavelength to beam paths 101A-104A, respectively, light beams L1B-L4B are assigned in order of increasing wavelength to beam paths 101B-104B, respectively, and light beams L1A-L4A are intermediate in wavelength between light beams L2B and L4B. This allows second reflector 130B to have a single band-pass transmission characteristic. Subject to the condition that light beams L1A-L4A be intermediate in wavelength between light beams L2B and L4B, light beams L1A-L4A may be (a) longer in wavelength than light beam L3B or (b) intermediate in wavelength between light beams L2B and L3B. In these cases, first reflector 520B has a band-pass or a short-pass transmission characteristic, respectively.

Wavelength-dependent first reflector 520B can be embodied as a dichroic filter on a surface of a thin transparent wafer in a manner similar to that described above with reference to FIGS. 5A-5D, as a dichroic filter located between two triangular prisms in a manner similar to that described above with reference to FIGS. 6A-6D, as a dichroic filter located between a rhomboidal prism and another prism in a manner similar to that described above with reference to FIGS. 7A-7D, or in some other suitable way.

In the example shown in FIGS. 9A and 9B, a dichroic filter 526 provides first reflector 520B with its wavelength-dependent reflectivity. Dichroic filter 526 is located between rhomboidal prism 480B and a triangular prism 540. Specifically, dichroic filter 416B that constitutes part of first filter element 110B is deposited on one major surface of rhomboidal prism 480B in a manner similar to that described above with reference to FIGS. 7A-7D, and dichroic filter 526 is deposited on the other major surface of rhomboidal prism 480B opposite dichroic filter 416B. Triangular prism 540 is interposed between rhomboidal prism 480B of multiplexer module 552B and triangular prism 450A of multiplexer module 552A to couple combined beam C3A output by multiplexer module 552A to multiplexer module 552B. Specifically, the hypotenuse surface of triangular prism 540 is bonded to the exposed surface of dichroic filter 526 on the major surface of rhomboidal prism 480B. In an alternative arrangement, dichroic filter 526 is deposited on the hypotenuse surface of triangular prism 540, and the exposed surface of dichroic filter 526 is bonded to the major surface of rhomboidal prism 480B opposite dichroic filter 416B. One of the opposite surfaces of triangular prism 540 is additionally bonded to one of the opposite surfaces of triangular prism 450A, one of the side surfaces of triangular prism 400A, and part of one of the side surfaces of rhomboidal prism 480A to complete fabrication of multiplexer 550 as a monolithic structure.

In the example of multiplexer 550 shown in FIGS. 9A-9B, multiplexer module 552A is positioned relative to multiplexer module 552B such that combined beam C3A output by multiplexer module 552A is incident at the same location on the first reflector 520B of multiplexer module 552B as that at which light beam L3B is incident. In another example, multiplexer module 552A is positioned relative to multiplexer module 552B such that combined beam C3A output by multiplexer module 552A is incident at the same location on the first reflector 520B of multiplexer module 552B as that at which light beam L4B is incident.

As an alternative to the concatenated structures described above with reference to FIGS. 8, 9A and 9B, the basic four-input multiplexer 200 described above with reference to FIGS. 3A-3D and 4A-4D may be expanded to form a multiplexer capable of combining an increased number of light beams. The basic multiplexer is expanded by interposing one or more planar additional filter elements between either or both of (a) first filter element 110 and first reflector 120, and (b) second filter element 130 and second reflector 140. A single additional filter element interposed between first filter element 110 and first reflector 120 or between second filter element 130 and second reflector 140 forms a six-input multiplexer. Two additional filter elements interposed between first filter element 110 and first reflector 120 or between second filter element 130 and second reflector 140 forms an eight-input multiplexer. A single additional first filter element interposed between first filter element 110 and first reflector 120 and a single additional second filter element interposed between second filter element 130 and second reflector 140 forms a nine-input multiplexer. However, an embodiment of a multiplexer having the structure just described and in which the filter elements have a transmission characteristic no more complex than a band-pass characteristic or a band-stop characteristic can combine no more than eight light beams having mutually-different wavelengths.

FIGS. 10A-10D and 11A-11D show examples a six-input optical wavelength multiplexer or a six-input optical wavelength demultiplexer in accordance with two alternative embodiments of the invention. FIGS. 10A-10D show examples of two configurations of a six-input multiplexer 600 having an additional first filter element 610 interposed between first filter element 110 and first reflector 120. FIGS. 11A-11D show examples of two configurations of a six-input multiplexer 650 having an additional second filter element 630 interposed between second filter element 130 and second reflector 140. In FIGS. 10A-10D and 11A-11D, the figures with -A and -B suffixes are respectively a side view and a front view showing an X-Z configuration, and the figures with the -C and -D suffixes are respectively a plan view and a front view showing an X-Y configuration.

Referring now to FIGS. 10A-10D, each example of multiplexer 600 is composed of a planar first filter element 110, a planar first reflector 120, a planar second filter element 130, a planar second reflector 140 and an additional first filter element 610 between first filter element 110 and first reflector 120. First reflector 120 is parallel to the first filter element 110 and offset therefrom in a third direction D3. Second filter element 130 is offset from first filter element 110 in a first direction D1 to receive light reflected and transmitted from a first location 112 on the first filter element. Second filter element 130 and first filter element 110 have orthogonal surface normals. Second reflector 140 is parallel to second filter element 130 and offset from the second filter element in a second direction D2 to receive light reflected and transmitted from a second location 114 on first filter element 110. Second direction D2 is orthogonal to first direction D1 and to third direction D3. Second location 114 is offset from first location 112 in the second direction. Additional first filter element 610 is parallel to the first filter element 110, and is offset from the first filter element in third direction D3.

Each of first filter element 110, additional first filter element 610 and second filter element 130 is configured to transmit light and to reflect light in non-overlapping wavelength ranges. At least one of first filter element 110 and second filter element 130 has either a band-pass transmission characteristic or a band-stop transmission characteristic.

In the example shown in FIGS. 10A-10D, light beams L1 and L2 are incident on first filter element 110 at locations 112 and 114, respectively. Light beams L6 and L3 are incident on additional first filter element 610 at respective locations spatially offset from one another in the −x-direction and light beams L5 and L4 are incident on first reflector 120 at respective locations spatially offset from one another in the −x-direction. The locations at which light beams L3 and L4 are incident are spatially offset from the locations at which light beams L6 and L5, respectively, are incident by a distance equal to the offset of second reflector 140 from second filter element 130.

In FIG. 10A, light beams L6 and L5 are hidden by light beam L1, and light beams L3 and L4 are hidden by light beam L2. Moreover, in FIG. 10B, light beams L2, L3 and L4 are hidden by light beams L1, L6 and L5, respectively. In this disclosure, the presence of a hidden light beam is indicated by the identifier of the hidden light beam set forth in parentheses next to or below the identifier of the light beam that hides the hidden light beam. For example, in FIG. 10B, hidden light beam L2 is indicated by its identifier L2 set forth in parentheses below L1, the identifier of the light beam that hides light beam L2. Note, however, that the arrangement of light beams L1-L6 on first filter element 110, additional first filter element 610 and first reflector 120 in the example shown in FIGS. 10A and 10B is similar to the arrangement of the light beams shown in FIG. 10C.

Light beams L5 and L4 travel in the z-direction and are incident on first reflector 120. First reflector 120 reflects light beams L5 and L4 in the y-direction towards additional first filter element 610. Light beams L6 and L3 travel in the z-direction and are incident on additional first filter element 610 at the same locations as light beams L5 and L4, respectively. Additional first filter element 610 reflects light beams L6 and L3 and transmits light beams L5 and L4 to form combined beams C1 and C2, respectively. Combined light beams C1 and C2 travel in the y-direction towards first filter element 110. Light beams L1 and L2 travel in the z-direction and are incident on first filter element 110 at the same location as combined beams C1 and C2, respectively.

In the configuration of multiplexer 600 shown in FIGS. 10A and 10B, first filter element 110 transmits light beams L1 and L2 and reflects combined beams C1 and C2, respectively, to form combined beams C3 and C4, respectively. Combined beams C3 and C4 travel in the z-direction towards second filter element 130 and second reflector 140, respectively. Second reflector 140 reflects combined beam C4 in the x-direction towards second filter element 130. Combined beam C3 is incident on second filter element 130 in the z-direction at the same location as combined beam C4. Second filter element 130 reflects combined beam C3 and transmits combined beam C4 to form combined beam C5. Combined beam C5 travels in the x-direction and is output by multiplexer 600.

In the configuration of multiplexer 600 shown in FIGS. 10C and 10D, first filter element 110 reflects light beams L1 and L2 and transmits combined beams C1 and C2, respectively, to form combined beams C3 and C4, respectively. Combined beams C3 and C4 travel in the y-direction towards second filter element 130 and second reflector 140, respectively. Second reflector 140 reflects combined beam C4 in the x-direction towards second filter element 130. Combined beam C3 is incident on second filter element 130 in the y-direction at the same location as combined beam C4. Second filter element 130 reflects combined beam C3 and transmits combined beam C4 to form combined beam C5. Combined beam C5 travels in the x-direction and is output by multiplexer 600.

Referring now to FIGS. 11A-11D, each example of multiplexer 650 is composed of a planar first filter element 110, a planar first reflector 120, a planar second filter element 130, a planar second reflector 140 and an additional second filter element 630 between second filter element 130 and second reflector 140. First reflector 120 is parallel to the first filter element 110 and offset therefrom in a third direction D3. Second filter element 130 is offset from first filter element 110 in a first direction D1 to receive light reflected and transmitted from a first location 112 on the first filter element. Second filter element 130 and first filter element 110 have orthogonal surface normals. Second reflector 140 is parallel to second filter element 130 and is offset from the second filter element in a second direction D2 to receive light reflected and transmitted from a second location 114 on first filter element 110.

Second direction D2 is orthogonal to first direction D1 and to third direction D3. Second location 114 is offset from first location 112 in the second direction. Additional second filter element 630 is parallel to second filter element 130, and is offset from the second filter element in second direction D2.

Each of first filter element 110, second filter element 130 and additional second filter element 630 is configured to transmit light and to reflect light in non-overlapping wavelength ranges. At least one of first filter element 110 and second filter element 130 has either a band-pass transmission characteristic or a band-stop transmission characteristic.

Figure 11A:
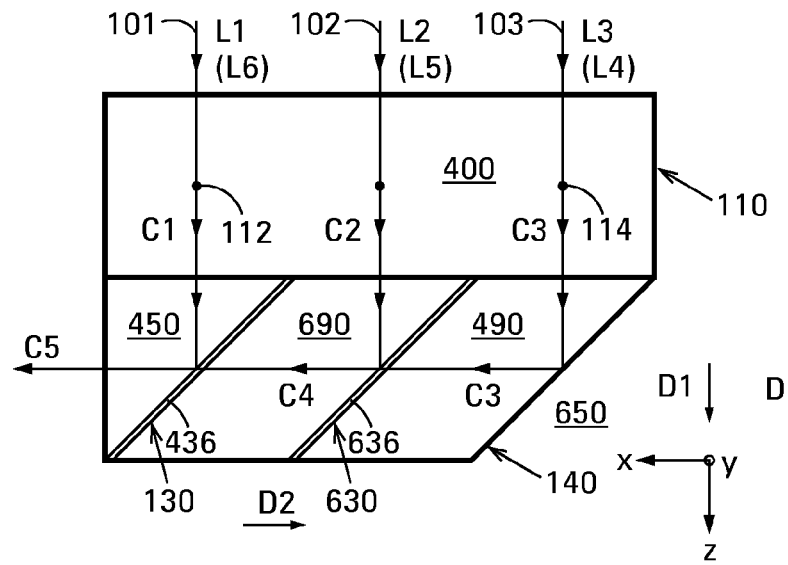
FIGS. 11A and 11B are respectively a side view and a front view showing an example of a optical wavelength multiplexer/demultiplexer based on the multiplexer/demultiplexer shown in FIGS. 3A-3C with an additional second filter element.
Figure 11B:
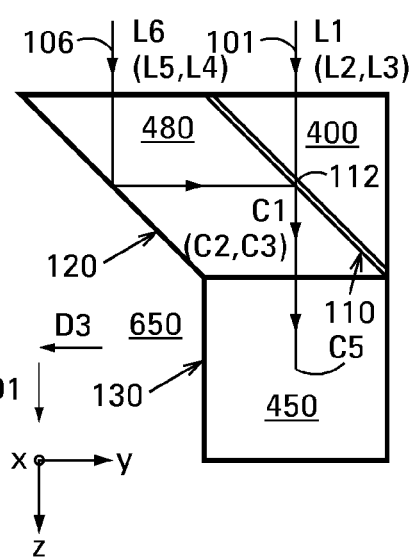

In the example shown in FIGS. 11A-11D, light beams L1, L2 and L3 are incident on first filter element 110 at respective locations spatially offset from one another in the −x-direction. Light beams L6, L5 and L4 are incident on first reflector 120 at respective locations spatially offset from one another in the −x-direction. In FIG. 11A, light beams L6, L5 and L4 are hidden by light beams L1, L2 and L3, respectively. Note, however, that the arrangement of light beams L1-L6 on first filter element 110 and first reflector 120 in the example shown in FIGS. 11A and 11B is similar to the arrangement of the light beams shown in FIG. 11C.

The locations at which light beams L2 and L5 are incident are spatially offset from the locations at which light beams L1 and L6, respectively, are incident by a distance equal to the offset of additional second filter element 630 from second filter element 130. The locations at which light beams L3 and L4 are incident are spatially offset from the locations at which light beams L1 and L6, respectively, are incident by a distance equal to the offset of second reflector 140 from second filter element 130.

Light beams L6, L5 and L4 travel in the z-direction and are incident on first reflector 120. First reflector 120 reflects light beams L6, L5 and L4 in the y-direction towards first filter element 110. Light beams L1, L2 and L3 travel in the z-direction and are incident on first filter element 110 at the same locations as light beams L6, L5 and L4, respectively.

In the configuration of multiplexer 650 shown in FIGS. 11A and 11B, first filter element 110 transmits light beams L1, L2 and L3 and reflects light beams L6, L5 and L4, respectively, to form combined beams C1, C2 and C3, respectively. Combined beams C1, C2 and C3 travel in the z-direction towards second filter element 130, additional second filter element 630 and second reflector 140, respectively. Second reflector 140 reflects combined beam C3 in the x-direction towards additional second filter element 630. Combined beam C2 is incident in the z-direction on additional second filter element 630 at the same location as combined beam C3. Additional second filter element 630 reflects combined beam C2 and transmits combined beam C3 to form a combined beam C4. Combined beam C4 travels in the x-direction towards second filter element 130. Combined beam C1 is incident in the z-direction on second filter element 130 at the same location as combined beam C4. Second filter element 130 reflects combined beam C1 and transmits combined beam C4 to form a combined beam C5. Combined beam C5 travels in the x-direction and is output by multiplexer 650.

Figure 11C:
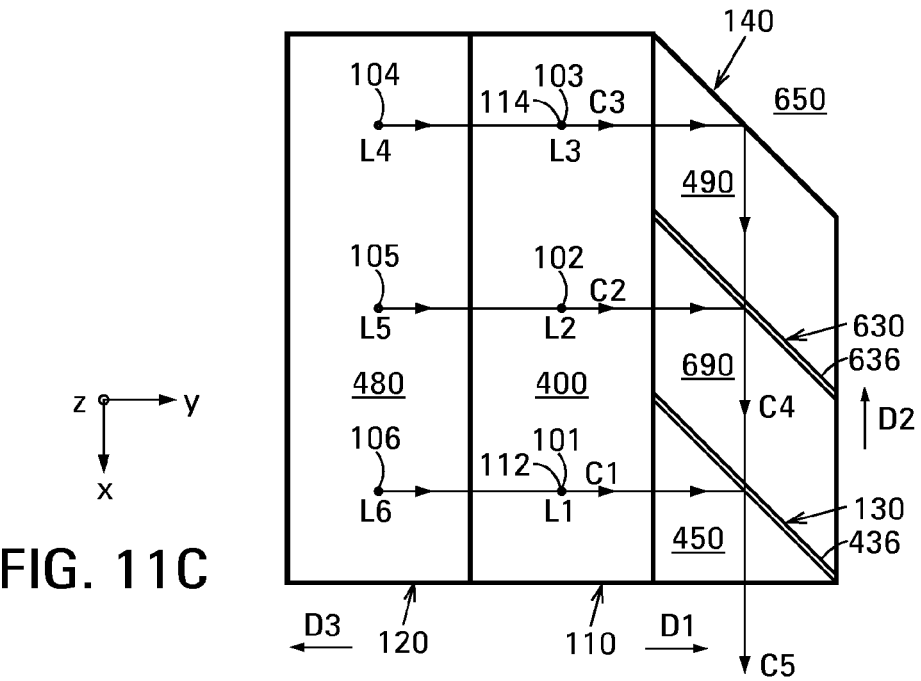
FIGS. 11C and 11D are respectively a plan view and a front view showing an example of a optical wavelength multiplexer/demultiplexer based on the multiplexer/demultiplexer shown in FIGS. 4A-4C with an additional second filter element.
Figure 11D:
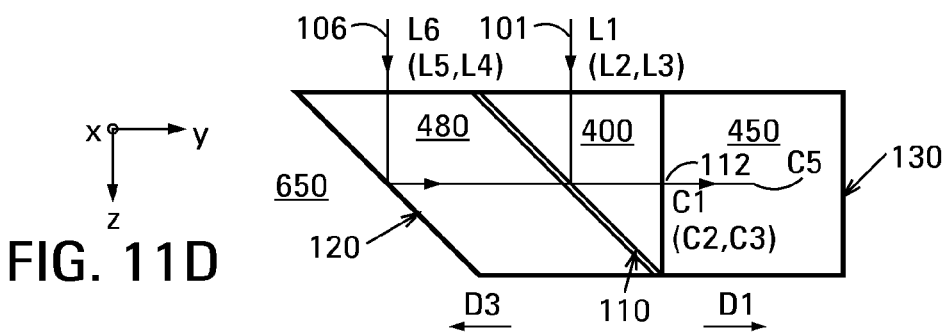

In the configuration of multiplexer 650 shown in FIGS. 11C and 11D, first filter element 110 reflects light beams L1, L2 and L3 and transmits light beams L6, L5 and L4, respectively, to form combined beams C1, C2 and C3, respectively. Combined beams C1, C2 and C3 travel in the y-direction towards second filter element 130, additional second filter element 630 and second reflector 140, respectively. Second reflector 140 reflects combined beam C3 in the x-direction towards additional second filter element 630. Combined beam C2 is incident in the y-direction on additional second filter element 630 at the same location as combined beam C3. Additional second filter element 630 reflects combined beam C2 and transmits combined beam C3 to form a combined beam C4. Combined beam C4 travels in the x-direction towards second filter element 130. Combined beam C1 is incident in the y-direction on second filter element 130 at the same location as combined beam C4. Second filter element 130 reflects combined beam C1 and transmits combined beam C4 to form a combined beam C5. Combined beam C5 travels in the x-direction and is output by multiplexer 650.

In the examples shown in FIGS. 10A-10D and 11A-11D, first filter element 110, additional first filter element 610, second filter element 130 and additional second filter element 630 are each embodied as a dichroic filter located between a rhomboidal prism and another prism in a manner similar to that described above with reference to FIGS. 7A-7D. In the example shown in FIGS. 10A-10D, additional first filter element 610 is embodied as a dichroic filter 616 located between a rhomboidal prism 680 and another prism (rhomboidal prism 480 in this example). In the example shown in FIGS. 11A-11D, additional second filter element 630 is embodied as a dichroic filter 636 located between a rhomboidal prism 690 and another prism (rhomboidal prism 490 in this example). Alternatively, all or some of the filter elements and additional filter elements can be embodied as a dichroic filter on a surface of a thin transparent wafer in a manner similar to that described above with reference to FIGS. 5A-5D, as a dichroic filter located between two triangular prisms in a manner similar to that described above with reference to FIGS. 6A-6D, or in another suitable way.

Light beams L1-L6 are incident on multiplexer 600 and multiplexer 650 along respective beam paths 101-106 each of which lies in both the x-z plane and the y-z plane. Light beams L1-L6 may be assigned to beam paths 101-106 in any order of wavelength. However, certain orders of wavelength assignment would require one or more of the filter elements and additional filter elements to have a transmission characteristic more complex than band-pass or band-stop characteristic. To allow the transmission characteristics of the filter elements and additional filter elements to have a transmission characteristic no more complex than a band-pass characteristic or a band-stop characteristic, the light beams are assigned to the beam paths in order of increasing wavelength. Beam paths 101-106 have a circular order in a manner similar to that described above, and light beams L1-L6 are assigned in order of increasing wavelength to beam paths 101-106 in the circular order just described. Alternatively, light beams L1-L6 are assigned in order of decreasing wavelength to beam paths 101-106 in the circular order just described.

Multiplexer 600 described above with reference to FIGS. 10A-10D may optionally have more than one additional first filter element interposed between first filter element 110 and first reflector 120. Similarly, multiplexer 650 described above with reference to FIGS. 11A-11D may optionally have more than one additional second filter element interposed between second filter element 130 and second reflector 140. Such additional filter elements increase the maximum number of light beams that can be combined by the respective multiplexer.

FIGS. 12A-12D show examples of an optical wavelength multiplexer/demultiplexer 700 in accordance with an embodiment of the invention. For brevity, optical wavelength multiplexer/-demultiplexer 700 will be referred to below as multiplexer 700 on the understanding that multiplexer 700 can additionally function as an optical demultiplexer simply by reversing the direction in which light travels through it. FIGS. 12A and 12B are respectively a side view and a front view showing an X-Z configuration of multiplexer 700, and FIGS. 12C and 12D are respectively a plan view and a front view showing an X-Y configuration of multiplexer 700. Multiplexer 700 is capable of combining as many as nine light beams into a single combined beam. However, as will be discussed in more detail below, embodiments of multiplexer 700 in which the filter elements and additional filter elements each have a transmission characteristic no more complex than a band-pass characteristic or a band-stop characteristic are capable of combining no more than eight light beams.

Each configuration of multiplexer 700 is composed of a planar first filter element 110, a planar first reflector 120, a planar second filter element 130, a planar second reflector 140, an additional first filter element 610 between first filter element 110 and first reflector 120 and an additional second filter element 630 between second filter element 130 and second reflector 140. First reflector 120 is parallel to first filter element 110 and offset therefrom in a third direction D3. Second filter element 130 is offset from first filter element 110 in a first direction D1 to receive light reflected and transmitted from a first location 112 on the first filter element. Second filter element 130 and first filter element 110 have orthogonal surface normals. Second reflector 140 is parallel to second filter element 130 and offset from the second filter element in a second direction D2 to receive light reflected and transmitted from a second location 114 on first filter element 110. Second direction D2 is orthogonal to first direction D1 and to third direction D3. Second location 114 is offset from first location 112 in the second direction. Additional first filter element 610 is parallel to first filter element 110, and is offset from the first filter element in third direction D3. Additional second filter element 630 is parallel to the second filter element 130, and is offset from the second filter element in second direction D2.

Each of first filter element 110, additional first filter element 610, second filter element 130 and additional second filter element 630 is configured to transmit light and to reflect light in non-overlapping wavelength ranges. At least one of first filter element 110 and second filter element 130 has either a band-pass transmission characteristic or a band-stop transmission characteristic.

In multiplexer 700, first filter element 110, additional first filter element 610, second filter element 130 and additional second filter element 630 are each embodied as a dichroic filter located between a rhomboidal prism and another prism in a manner similar to that described above with reference to FIGS. 7A-7D. Alternatively, all or some of the filter elements and additional filter elements can be embodied as a dichroic filter on a surface of a thin transparent wafer in a manner similar to that described above with reference to FIGS. 5A-5D, as a dichroic filter located between two triangular prisms in a manner similar to that described above with reference to FIGS. 6A-6D, or in another suitable way.

Light beams L1, L2 and L3 are incident on first filter element 110 at respective locations spatially offset from one another in the −x-direction, light beams L8, L9 and L4 are incident on additional first filter element 610 at respective locations spatially offset from one another in the −x-direction, and light beams L7, L6 and L5 are incident on first reflector 120 at respective locations spatially offset from one another in the −x-direction. In FIG. 12A, light beams L8 and L7, L9 and L6, and L4 and L5 are hidden by light beams L1, L2 and L3, respectively. Note, however, that the arrangement of light beams L1-L9 on first filter element 110, additional first filter element 610 and first reflector 120 in the example shown in FIGS. 12A and 12B is similar to the arrangement of the light beams shown in FIG. 12C. The locations at which light beams L2, L9 and L6 are incident are spatially offset from the locations at which light beams L1, L8 and L7, respectively, are incident by a distance equal to the offset of additional second filter element 630 from second filter element 130. The locations at which light beams L3, L4 and L5 are incident are spatially offset from the locations at which light beams L1, L8 and L7, respectively, are incident by a distance equal to the offset of second reflector 140 from second filter element 130.

Light beams L7, L6 and L5 travelling in the z-direction are incident on first reflector 120. First reflector 120 reflects light beams L7, L6 and L5 in the y-direction towards additional first filter element 610. Light beams L8, L9 and L4 travelling in the z-direction are incident on additional first filter element 610 at the same locations as light beams L7, L6 and L5, respectively. Additional first filter element 610 transmits light beams L7, L6 and L5 and reflects light beams L8, L9 and L4, respectively, to form combined beams C1, C2 and C3, respectively. Combined beams C1, C2 and C3 travel in the y-direction towards first filter element 110. Light beams L1, L2 and L3 travelling in the z-direction are incident on first filter element 110 at the same locations as combined beams C1, C2 and C3, respectively.

In the configuration of multiplexer 700 shown in FIGS. 12A and 12B, first filter element 110 transmits light beams L1, L2 and L3, and reflects combined beams C1, C2 and C3, respectively, to form combined beams C4, C5 and C6, respectively. Combined beams C4, C5 and C6 travel in the z-direction towards second filter element 130, additional second filter element 630 and second reflector 140, respectively. Second reflector 140 reflects combined beam C6 in the x-direction towards additional second filter element 630. Combined beam C5 is incident in the z-direction on additional second filter element 630 at the same location as combined beam C6. Additional second filter element 630 reflects combined beam C5 and transmits combined beam C6 to form a combined beam C7. Combined beam C7 travels in the x-direction towards second filter element 130. Combined beam C4 is incident in the z-direction on second filter element 130 at the same location as combined beam C7. Second filter element 130 reflects combined beam C4 and transmits combined beam C7 to form a combined beam C8. Combined beam C8 travels in the x-direction and is output by multiplexer 700.

In the configuration of multiplexer 700 shown in FIGS. 12C and 12D, first filter element 110 reflects light beams L1, L2 and L3, and transmits combined beams C1, C2 and C3, respectively, to form combined beams C4, C5 and C6, respectively. Combined beams C4, C5 and C6 travel in the y-direction towards second filter element 130, additional second filter element 630 and second reflector 140, respectively. Second reflector 140 reflects combined beam C6 in the x-direction towards additional second filter element 630. Combined beam C5 is incident in the y-direction on additional second filter element 630 at the same location as combined beam C6. Additional second filter element 630 reflects combined beam C5 and transmits combined beam C6 to form a combined beam C7 that travels in the x-direction towards second filter element 130. Combined beam C4 is incident in the y-direction on second filter element 130 at the same location as combined beam C7. Second filter element 130 transmits combined beam C7 and reflects combined beam C4 to form a combined beam C8, Combined beam C8 travels in the x-direction and is output by multiplexer 700.

Light beams L1-L9 are incident on multiplexer 700 along respective beam paths 101-109 each of which lies in both the x-z plane and the y-z plane. Light beams L1-L9 may be assigned to beam paths 101-109 in any order of wavelength.

However, every order of assigning a light beam to every one of beam paths 101-109 requires that one or more of the filter elements and additional filter elements have a transmission characteristic more complex than band-pass or band-stop characteristic. To allow the transmission characteristics of the filter elements and additional filter elements to be no more complex than a band-pass characteristic or a band-stop characteristic, light beams are assigned in order of increasing wavelength to no more than eight beam paths. The eight beam paths have a circular order in a manner similar to that described above, and light beams L1-L8 are assigned in order of increasing wavelength to the beam paths in the circular order just described. Alternatively, light beams L1-L8 are assigned in order of decreasing wavelength to the beam paths in the circular order just described.

Figures 13A, 13B, 13C:
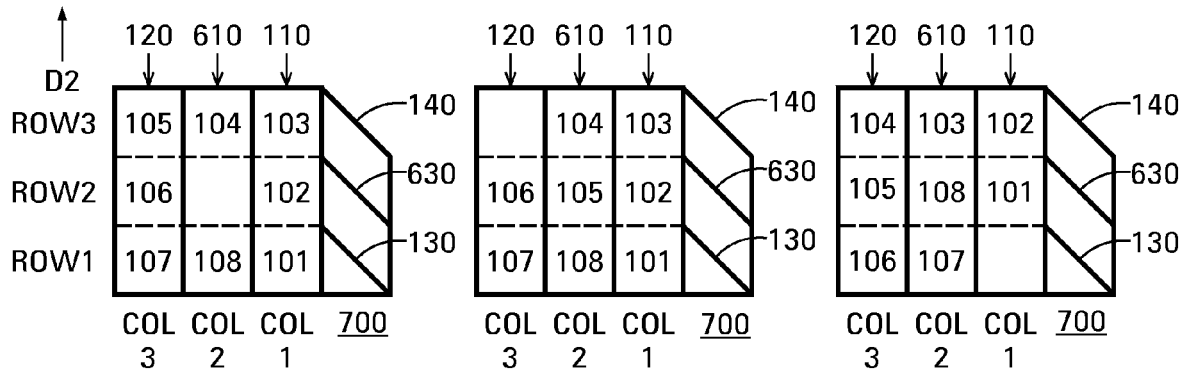
FIGS. 13A-13C are plan views showing the optical wavelength multiplexer/demultiplexer shown in FIGS. 12C and 12D and schematically illustrating arrangements of the beam paths that allow the filter elements and additional filter elements to have respective transmission characteristics no more complex than a band-pass or a band-stop characteristic.

FIGS. 13A-13C are plan views of multiplexer 700 schematically illustrating three arrangements of eight beam paths 101-108 that allow the filter elements and additional filter elements of multiplexer 700 to have transmission characteristics no more complex than a band-pass or a band-stop characteristic. The beam path arrangements shown in FIGS. 13B and 13C are alternative arrangements. As noted above, the order of beam paths 101-108 is circular, so that beam path 101 follows beam path 108 in the circular order. Light beams L1-L8 (FIG. 12C) in order of increasing wavelength or in order of decreasing wavelength are assigned to beam paths 101-108 in the circular order.

In applications in which the light beams have uniform proportional wavelength spacings, the light beam having the shortest wavelength (or the longest wavelength) may be assigned to any one of beam paths 101-108. As noted above, the proportional wavelength spacing between two light beams having adjacent wavelengths $\lambda_1$ and $\lambda_2$ is the quotient of the difference between the wavelengths and the sum of the wavelengths, i.e., $(\lambda_1-\lambda_2)/(\lambda_1+\lambda_2)$. In applications in which the light beams have non-uniform proportional wavelength spacings, designing and fabricating of the filter elements and additional filter elements is made easier by imposing additional constraints on the allocation of the light beams to the beam paths. Such additional constraints will be described below with reference to FIGS. 15A-15D.

The beam path arrangements illustrated in FIGS. 13A-13C are determined by following a set of design rules that will be described next. The design rules are universally applicable, i.e., in multiplexers of any complexity having a structure similar to the examples described above, the design rules can be used to determine beam path arrangements that allow the filter elements and additional filter elements (when present) to be have transmission characteristics no more complex than a band-pass or a band-stop characteristic.

The maximum possible number of beam paths that may extend towards a multiplexer having a given arrangement of a first filter element, zero or more additional first filter elements, a first reflector, a second filter element, zero or more additional second filter elements and a second reflector is determined as follows. The first filter element, the zero or more additional first filter elements and the first reflector will be referred to collectively as first elements. The first elements collectively number M. The second filter element, the zero or more additional second filter element and the second reflector will be referred to collectively as second elements. The second elements collectively number N. The first elements and the second elements collectively number P, where P=M+N.

The maximum possible number of beam paths that may extend towards the multiplexer is the product of M and N. The maximum possible number of beam paths can be regarded as being arranged in a rectangular array of M columns and N rows.

As noted above with reference to FIGS. 12A-12D, in embodiments in which the filter elements and the additional filter elements have transmission characteristics no more complex than a band-pass or a band-stop characteristic, the maximum number of beam paths that may extend towards the multiplexer is calculated by multiplying the total number of elements P by two and subtracting four. i.e., 2P−4. Depending on the arrangement of the elements, the maximum number of beam paths is less than or equal to the maximum possible number of beam paths, i.e., 2P−4≦M*N.

In the examples of multiplexer 600 described above with reference to FIGS. 10A-10D, M=3, N=2 and P=5. The maximum possible number of beam paths is six (3*2), and the maximum number of beam paths is also six ((2*5)−4). In the examples of multiplexer 650 described above with reference to FIGS. 11A-11D, M=2, N=3 and P=5. The maximum possible number of beam paths is six (2*3), and the maximum number of beam paths is also six ((2*5)−4). In the examples of multiplexer 700 described above with reference to FIGS. 12A-12D, M=3, N=3 and P=6. The maximum possible number of beam paths is nine (3*3), and the maximum number of beam paths is eight ((2*6)−4), one fewer than the maximum possible number.

In other examples, in a multiplexer having two additional first filter elements and one additional second filter element (M=4, N=3, P=7) or vice versa, the maximum possible number of beam paths is twelve (4*3) or (3*4), whereas the maximum number of beam paths is ten ((2*7)−4). In a multiplexer having three additional first filter elements and no additional second filter element (M=5, N=2, P=7) or vice versa, the maximum possible number of beam paths is ten (5*2) or (2*5), and the maximum number of beam paths is also ten ((2*7)−4). In a multiplexer having two additional first filter elements and two additional second filter elements (M=4, N=4, P=8), the maximum possible number of beam paths is sixteen (4*4), whereas the maximum number of beam paths is twelve ((2*8)−4).

The no more than (2P−4) beam paths along which respective light beams are incident on a multiplexer composed of M first elements and N second elements extend towards the first elements according to the following rules:

1. The no more than (2P−4) beam paths are numbered using a circular numbering scheme, i.e., the beam path numbered 1 follows the beam path numbered (2P−4);
2. The beam paths extend towards the first elements at locations constituting at least part of an M-column, N-row rectangular array with the columns parallel to the second direction D2;
3. No more than N consecutively-numbered beam paths extend towards respective locations in a first column, which is an edge column, i.e., a column having only one column adjacent to it;
4. For each remaining column progressively offset from the first column, no more than N consecutively-numbered beam paths extend towards respective locations in the column. The beam paths extending towards respective locations in the column are numbered one or both of (a) consecutively greater than, and (b) consecutively less than, the beam paths already assigned.
5. No more than M consecutively-numbered beam paths extend towards respective locations in a first row, which is an edge row, i.e., a row having only one row adjacent to it; and 6. For each remaining row progressively offset from the first row, no more than M consecutively-numbered beam paths extend towards respective locations in the row. The beam paths extending towards locations in the row are numbered one or both of (a) consecutively greater than, and (b) consecutively less than, the beam paths already assigned.

Once the locations towards which the beam paths extend have been determined, the light beams in order of increasing wavelength or in order of decreasing wavelength are assigned to respective ones of the beam paths in the circular order.

Referring to FIG. 13A, eight beam paths numbered 101-108 extend towards respective locations on a multiplexer composed of three first elements (M=3) and three second elements (N=3) in compliance with rule 1 and rule 2. N beam paths, namely, beam paths 101, 102 and 103, extend towards respective locations on first filter element 110, which constitutes column 1 of the above-described rectangular array and is an edge column, i.e., only column 2 is adjacent column 1. Beam paths 101, 102 and 103 are consecutively numbered in accordance with the above-described circular numbering scheme in compliance with rule 3. N−1 beam paths, namely, beam paths 108 and 104, extend towards respective locations on additional first filter element 610, which constitutes column 2 of the above-described rectangular array. Column 2 is progressively offset from column 1. In the circular numbering scheme, beam path 108 is numbered consecutively less than the beam paths 101-103 already assigned in column 1 and beam path 104 is numbered consecutively greater than the beam paths already assigned in column 1 in compliance with rule 4. In this instance, the beam paths incident on column 2 are numbered both consecutively greater than (104>103) and consecutively less than (108<101) the beam paths already assigned in column 1. N beam paths, namely, beam paths 107, 106 and 105, extend towards respective locations on first reflector 120, which constitutes column 3 of the above-described rectangular array. Column 3 is progressively offset from column 2. Beam paths 107, 106 and 105 are consecutively numbered, and are numbered both consecutively greater than (105>104) and consecutively less than (107<108) the beam paths 108-104 already assigned in columns 1 and 2, also in compliance with rule 4. There are many other arrangements of the beam paths that comply with rules 1-4, but most of them are eliminated when rules 5 and 6 are applied.

In the example shown in FIG. 13A, in which the arrangement additionally complies with rules 5 and 6, M beam paths, namely, beam paths 101, 108 and 107, extend towards respective locations on portions of first filter element 110, additional first filter element 610 and first reflector 120 aligned with second filter element 130. Such portions constitute row 1 of the above-described rectangular array. Row 1 is an edge row, i.e., only row 2 is adjacent row 1. Beam paths 101, 108 and 107 are consecutively numbered in accordance with the above-described circular numbering scheme in compliance with rule 5. M−1 beam paths, namely, beam paths 102 and 106, extend towards portions of first filter element 110 and first reflector 120 aligned with additional second filter element 630. Such portions constitute row 2 of the above-described rectangular array. Row 2 is progressively offset from row 1. Beam path 106 is numbered consecutively less than the beam paths (107-101) already assigned in row 1 and beam path 102 is numbered consecutively greater than the beam paths already assigned in row 1 in compliance with rule 6. Again, the beam paths incident on row 2 are numbered both consecutively greater than and consecutively less than the beam paths already assigned in row 1. M beam paths, namely, beam paths 103, 104 and 105, extend towards portions of first filter element 110, additional first filter element 610 and first reflector 120 aligned with second reflector 140. Such portions constitute row 3 of the above-described rectangular array. Row 3 is progressively offset from row 2. Beam paths 103, 104 and 105 are consecutively numbered, and are numbered both consecutively greater than (103>102) and consecutively less than (105<106) the beam paths already assigned to rows 1 and 2, also in compliance with rule 6.

Light beams L1-L8, in order of increasing wavelength or in order of decreasing wavelength, are then assigned to respective ones of beam paths 101 -108 in the circular order. Such assignment will be described in greater detail below.

Referring to the example shown in FIG. 13B, eight beam paths numbered 101-108 extend towards multiplexer 700 composed of three first elements (M=3) and three second elements (N=3) in compliance with rule 1 and rule 2. N beam paths, namely, beam paths 101, 102 and 103, extend towards first filter element 110, which constitutes column 1 of the above-described rectangular array and is an edge row. Beam paths 101, 102 and 103 are consecutively numbered in accordance with the above-described circular numbering scheme in compliance with rule 3. N beam paths, namely, beam paths 108, 105 and 104, extend towards additional first filter element 610, which constitutes column 2 of the above-described rectangular array. In the circular numbering scheme, beam path 108 is numbered consecutively less than beam paths 101-103 already assigned in column 1 and beam paths 104 and 105 are numbered consecutively greater than the beam paths already assigned in column 1 in compliance with rule 4. In this instance, the beam paths incident in column 2 are numbered both consecutively greater than (104>103) and consecutively less than (108<101) the beam paths already assigned in column 1. N−1 beam paths, namely, beam paths 107 and 106, extend towards first reflector 120, which constitutes column 3 of the above-described rectangular array. Beam paths 107 and 106 are consecutively numbered, and are numbered both consecutively less than (107<108) and consecutively greater than (106>105) the beam paths already assigned in columns 1 and 2, also in compliance with rule 4.

Moreover, M beam paths, namely, beam paths 101, 108 and 107, extend towards row 1 of the above-described rectangular array. Row 1 is an edge row. Beam paths 101, 108 and 107 are consecutively numbered in accordance with the above-described circular numbering scheme in compliance with rule 5. M beam paths, namely, beam paths 102, 105 and 106, extend towards row 2 of the above-described rectangular array. Row 2 is progressively offset from row 1. Beam paths 106 and 105 are numbered consecutively less than beam paths 107-101 already assigned in row 1, and beam path 102 is numbered consecutively greater than the beam paths already assigned in row 1 in compliance with rule 6. Again, the beam paths incident in row 2 are numbered both consecutively greater than and consecutively less than the beam paths already assigned in row 1. M−1 beam paths, namely, beam paths 103 and 104, are incident in row 3 of the above-described rectangular array. Beam paths 103 and 104 are consecutively numbered, and are numbered both consecutively greater than (103>102) and consecutively less than (104<105) beam paths 105-102 already assigned to rows 1 and 2, also in compliance with rule 6.

Light beams L1-L8, in order of increasing wavelength or in order of decreasing wavelength, are then assigned to respective ones of beam paths 101-108 in the circular order, as will be described below.

An analysis similar to the analyses described above with reference to the exemplary beam path arrangements set forth above with reference to FIGS. 13A and 13B applies to the beam path arrangement shown in FIG. 13C.

FIGS. 14A-14E are plan views showing examples of an optical wavelength multiplexer/-demultiplexer 800 in accordance with an embodiment of the invention. For brevity, optical wavelength multiplexer/demultiplexer 800 will be referred to below as multiplexer 800 on the understanding that multiplexer 800 can additionally function as an optical demultiplexer simply by reversing the direction in which light travels through it. Multiplexer 800 is a ten-input multiplexer. The examples of multiplexer 800 shown in FIGS. 14A and 14B have four first elements and three second elements, and those shown in FIGS. 14C and 14D have three first elements and four second elements. In the examples shown in FIGS. 14A-14D, the total number of elements P is seven, the maximum possible number of beam paths is 4*3=12, and the maximum number of beam paths that allows the filter elements and additional filter elements to have transmission characteristics no more complex than a band-pass or band-stop characteristic is (2*7)−4=10.

Figures 14A, 14B:
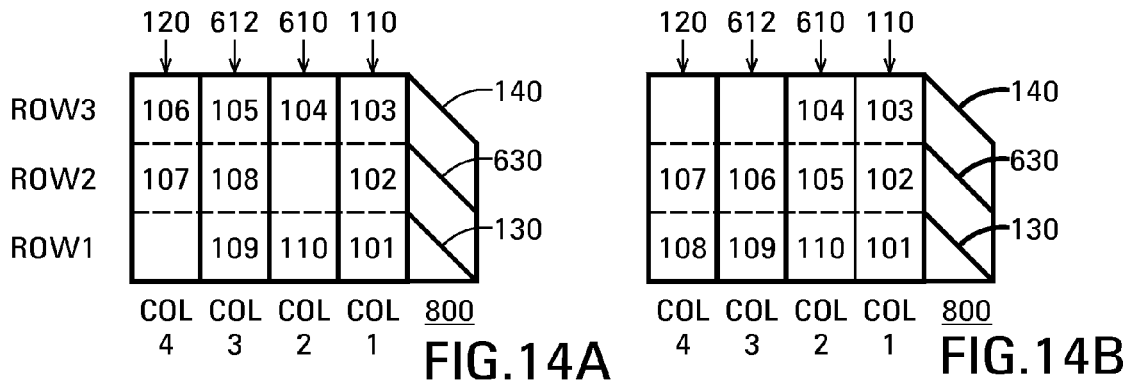
FIGS. 14A-14E are plan views showing examples of a ten-input optical wavelength multiplexer/demultiplexer schematically illustrating arrangements of the beam paths that allow the filter elements and additional filter elements to have respective transmission characteristics no more complex than a band-pass or a band-stop characteristic.
Figures 14C, 14D:
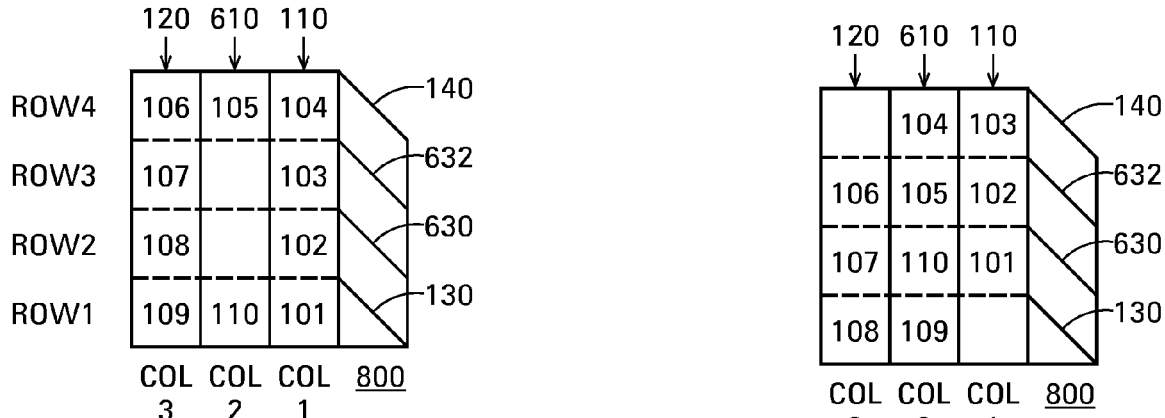
Figure 14E:
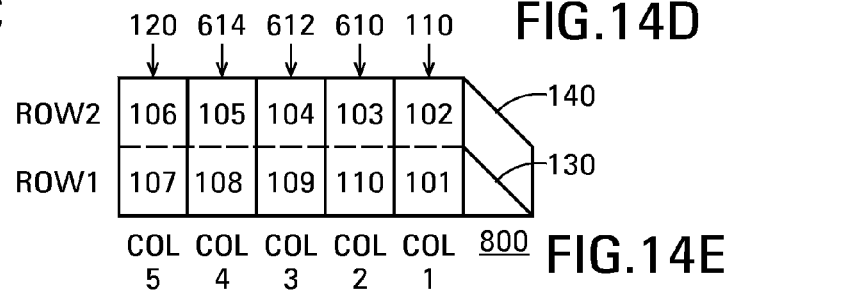

The example shown in FIG. 14E has five first elements and two second elements. The example shown in FIG. 14E could alternatively have two first elements and five second elements. The total number of elements P is again seven, the maximum possible number of beam paths is 5*2=10, and the maximum number of beam paths that allows the filter elements and additional filter elements to have transmission characteristics no more complex than a band-pass or band-stop characteristic is (2*7)−4=10. Thus, in this example, two beam paths extend towards each one of the five first elements.

In the examples shown in FIGS. 14A-14D, beam paths extend towards ten of the twelve possible locations in accordance with rules 1-6 set forth above. For example, referring to FIG. 14B, ten beam paths numbered 101-110 extend towards a multiplexer 800 composed of four first elements (M=4) and three second elements (N=3) in compliance with rule 1 and rule 2. N beam paths, namely, beam paths 101, 102 and 103, extend towards first filter element 110, which constitutes column 1 of the above-described rectangular array and is an edge row. Beam paths 101, 102 and 103 are consecutively numbered in accordance with the above-described circular numbering scheme in compliance with rule 3. N beam paths, namely, beam paths 110, 105 and 104, extend towards first additional first filter element 610, which constitutes column 2 of the above-described rectangular array. Column 2 is progressively offset from column 1. In the circular numbering scheme, beam paths 104 and 105 are numbered consecutively greater than beam paths 101-103 already assigned in column 1, and beam path 110 is numbered consecutively less than the beam paths already assigned in column 1 in compliance with rule 4. N−1 beam paths, namely, beam paths 109 and 106, extend towards a second additional first filter element 612, which constitutes column 3 of the above-described rectangular array. Column 3 is progressively offset from column 2. In the circular numbering scheme, beam path 109 is numbered consecutively less than beam paths 110-105 already assigned in columns 1 and 2, and beam path 106 is numbered consecutively greater than the beam paths already assigned in columns 1 and 2 in compliance with rule 4. N−1 beam paths, namely, beam paths 108 and 107, extend towards first reflector 120, which constitutes column 4 of the above-described rectangular array. Column 4 is progressively offset from column 3. Beam paths 107 and 108 are consecutively numbered, and are numbered both consecutively greater than (107>106) and consecutively less than (108<109) beam paths 109-106 already assigned in columns 1-3, also in compliance with rule 4.

Moreover, M beam paths, namely, beam paths 101, 110, 109 and 108, extend towards portions of first filter element 110, first additional first filter element 610, second additional first filter element 612 and first reflector 120 aligned with second filter element 130. Such portions constitute row 1 of the above-described rectangular array. Row 1 is an edge row. Beam paths 108, 109, 110 and 101 are consecutively numbered in accordance with the above-described circular numbering scheme in compliance with rule 5. M beam paths, namely, beam paths 102, 105, 106 and 107, extend towards portions of first filter element 110, first additional first filter element 610, second additional first filter element 612 and first reflector 120 aligned with additional second filter element 630. Such portions of the first elements constitute row 2 of the above-described rectangular array. Row 2 is progressively offset from row 1. Beam paths 107-105 are consecutively numbered and are numbered consecutively less than beam paths 108-101 already assigned in row 1 and beam path 102 is numbered consecutively greater than the beam paths already assigned in row 1 in compliance with rule 6. M−2 beam paths, namely, beam paths 103 and 104, extend towards portions of first filter element 110, first additional first filter element 610, second additional first filter element 612 and first reflector 120 aligned with second reflector 140. Such portions constitute row 3 of the above-described rectangular array. Row 3 is progressively offset from row 2. Beam paths 103 and 104 are consecutively numbered, and are numbered both consecutively greater than and consecutively less than beam paths 105-102 already assigned in rows 1 and 2, also in compliance with rule 6.

Light beams L1-L10, in order of increasing wavelength or in order of decreasing wavelength, are then assigned to respective ones of beam paths 101-110 in the circular order, as will be described below.

FIGS. 15A-15D are plan views showing examples of an optical wavelength multiplexer/-demultiplexer 900 in accordance with an embodiment of the invention. For brevity, optical wavelength multiplexer/demultiplexer 900 will be referred to below as multiplexer 900 on the understanding that multiplexer 900 can additionally function as an optical demultiplexer simply by reversing the direction in which light travels through it. Multiplexer 900 is a twelve-input multiplexer. The examples shown in FIGS. 15A-15C have four first elements and four second elements.

Figure 15A:
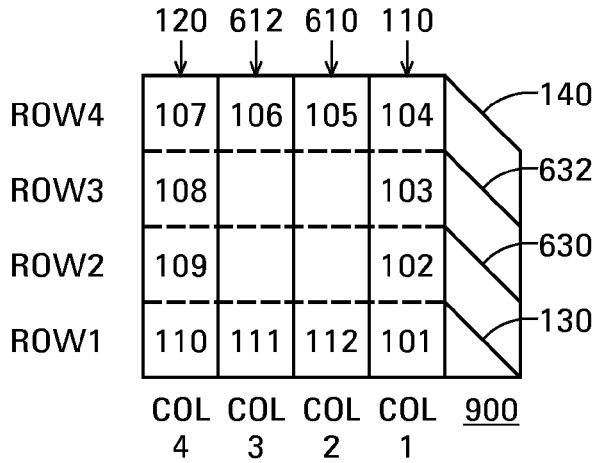
FIGS. 15A-15D are plan views showing examples of a twelve-input optical wavelength multiplexer/demultiplexer schematically illustrating arrangements of the beam paths that allow the filter elements and additional filter elements to have respective transmission characteristics no more complex than a band-pass or a band-stop characteristic.
Figure 15B:
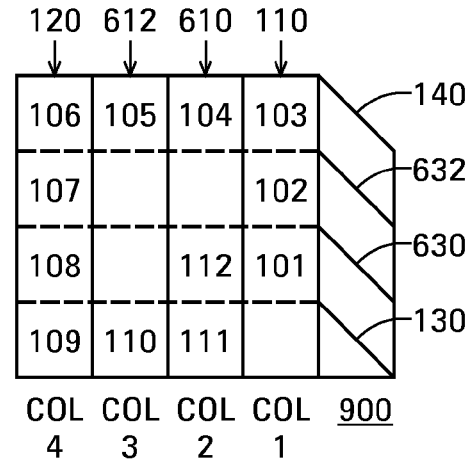
Figure 15C:
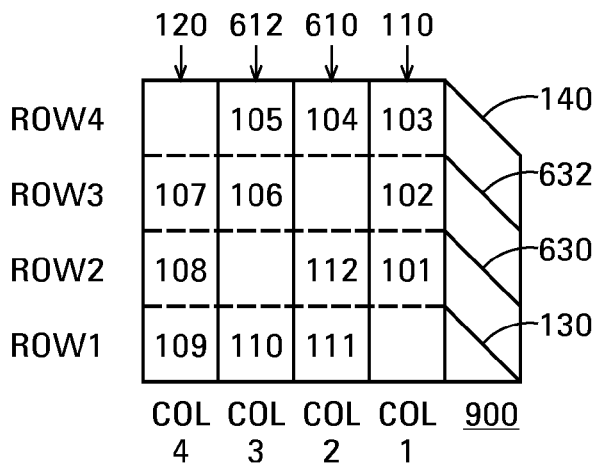

In the examples shown in FIGS. 15A-15C, the total number of elements P is eight, the maximum possible number of beam paths is 4*4=16, and the maximum number of beam paths that allows the filter elements and additional filter elements to have transmission characteristics no more complex than a band-pass or band-stop characteristic is (2*8)−4=12.

Figure 15D:
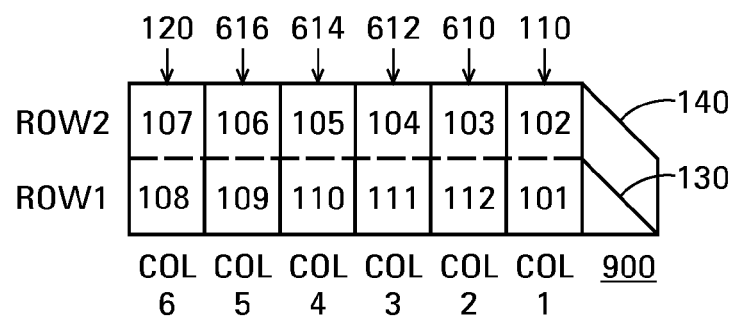

The example shown in FIG. 15D has six first elements, namely, first filter element 110, four additional first filter elements 610, 612, 614 and 616, and first reflector 120 and two second elements. The example shown in FIG. 15E could alternatively have two first elements and six second elements. The total number of elements P is eight, the maximum possible number of beam paths is 6*2=12, and the maximum number of beam paths that allows the filter elements and additional filter elements to have transmission characteristics no more complex than a band-pass or band-stop characteristic is (2*8)−4=12. Thus, in this example, two beam paths extend towards each one of the six first elements.

In the examples shown in FIGS. 15A-15C, beam paths extend towards 12 of the 16 possible locations in accordance with rules 1-6 set forth above. For example, referring to FIG. 15C, twelve beam paths numbered 101-112 extend towards multiplexer 900 composed of four first elements (M=4) and four second elements (N=4) in compliance with rule 1 and rule 2. N−1 beam paths, namely, beam paths 101, 102 and 103, extend towards first filter element 110, which constitutes column 1 of the above-described rectangular array and is an edge row. Beam paths 101, 102 and 103 are consecutively numbered in accordance with the above-described circular numbering scheme in compliance with rule 3. N−1 beam paths, namely, beam paths 111, 112 and 104, extend towards first additional first filter element 610, which constitutes column 2 of the above-described rectangular array. Column 2 is progressively offset from column 1. In the circular numbering scheme, beam path 104 is numbered consecutively greater than beam paths 101-103 already assigned in column 1, and beam paths 112 and 111 are consecutively numbered and are numbered consecutively less than the beam paths already assigned in column 1 in compliance with rule 4. N−1 beam paths, namely, beam paths 110, 106 and 105 extend towards second additional first filter element 612, which constitutes column 3 of the above-described rectangular array. Column 3 is progressively offset from column 2. In the circular numbering scheme, beam paths 105 and 106 are consecutively numbered and are numbered consecutively greater than beam paths 111-104 already assigned in columns 1 and 2, and beam path 110 is consecutively numbered less than the beam paths already assigned in columns 1 and 2 in compliance with rule 4. N−1 beam paths, namely, beam paths 109, 108 and 107 extend towards first reflector 120, which constitutes column 4 of the above-described rectangular array. Column 4 is progressively offset from column 3. Beam paths 107, 108 and 109 are consecutively numbered, and are numbered both consecutively greater than and consecutively less than beam paths 110-106 already assigned in columns 1-3, also in compliance with rule 4.

Moreover, M−1 beam paths, namely, beam paths 111, 110 and 109 extend towards portions of first additional first filter element 610, second additional first filter element 612 and first reflector 120 aligned with second filter element 130. Such portions constitute row 1 of the above-described rectangular array. Row 1 is an edge row. Beam paths 109, 110 and 111 are consecutively numbered in accordance with the above-described circular numbering scheme in compliance with rule 5. M−1 beam paths, namely, beam paths 101, 112 and 108, extend towards portions of first filter element 110, first additional first filter element 610 and first reflector 120 aligned with first additional second filter element 630. Such portions of the first elements constitute row 2 of the above-described rectangular array. Row 2 is progressively offset from row 1. Beam paths 112 and 101 are consecutively numbered and are numbered consecutively greater than beam paths 109-111 already assigned in row 1 and beam path 108 is numbered consecutively less than the beam paths already assigned in row 1 in compliance with rule 6. M−1 beam paths, namely, beam paths 102, 106 and 107, extend towards portions of first filter element 110, second additional first filter element 612 and first reflector 120 aligned with a second additional second filter element 632. Such portions of the first elements constitute row 3 of the above-described rectangular array. Row 3 is progressively offset from row 2. Beam paths 105 and 106 are consecutively numbered and are numbered consecutively greater than beam paths 111-104 already assigned in row 1 and beam path 110 is numbered consecutively less than the beam paths already assigned in row 1 in compliance with rule 6. M−1 beam paths, namely, beam paths 103, 104 and 105, extend towards portions of first filter element 110, first additional first filter element 610, and second additional first filter element 612 aligned with second reflector 140. Such portions constitute row 4 of the above-described rectangular array. Row 4 is progressively offset from row 3. Beam paths 103, 104 and 105 are consecutively numbered, and are numbered both consecutively greater than and consecutively less than beam paths 106-102 already assigned in rows 1-3, also in compliance with rule 6.

Light beams L1-L12, in order of increasing wavelength or in order of decreasing wavelength, are then assigned to respective ones of beam paths 101-112 in the circular order, as will be described next.

In applications in which the light beams have uniform proportional wavelength spacings, the light beam having the shortest wavelength (or the longest wavelength) may be assigned to any one of the beam paths in the above-described multiplexers in accordance with the different embodiments of the invention. The remaining light beams in order of increasing wavelength or in order of decreasing wavelength are then assigned to the remaining beam paths in the above-described circular order. As noted above, the proportional wavelength spacing between two light beams adjacent in wavelength and having wavelengths $\lambda_1$ and $\lambda_2$, respectively, is the quotient of the difference between the wavelengths and the sum of the wavelengths, i.e., $(\lambda_1-\lambda_2)/(\lambda_1+\lambda_2)$.

In applications in which the light beams have non-uniform proportional wavelength spacings, designing and fabricating of the filter elements and additional filter elements is made easier by imposing additional constraints on the allocation of the light beams to the beam paths. Specifically, pairs of wavelength-adjacent light beams are ranked in order of increasing proportional wavelength spacing. The resulting ranking comprises what will be termed a small proportional wavelength spacing portion in which the pairs of light beams have smaller proportional wavelength spacings than those in the remainder of the ranking. The small proportional wavelength portion is typically no more than half of the ranking. The pairs of light beams in the small proportional wavelength portion of the ranking are defined as closely-spaced wavelength pairs. The light beams are assigned in order of increasing wavelength or in order of decreasing wavelength to the beam paths in the circular order such that, to provide the filtering required to combine the light beams, some of the filter elements (and additional filter elements if present) have a cut-on wavelength or a cut-off wavelength between the wavelengths of one closely-spaced wavelength pair incident thereon, but none of the filter elements (and additional filter elements if present) has a cut-on wavelength or a cut-off wavelength between the wavelengths of more than one closely-spaced wavelength pair incident thereon. In other words, the light beams are assigned to the beam paths such that none of the filter elements has to discriminate between the wavelengths of more than one closely-spaced wavelength pair. The resulting assignment is effectively a clockwise or anti-clockwise rotation of the above-described assignment of light beams L1-LP to beam paths 101 to (100+P), respectively.

The design and fabrication of the filter elements and additional filter elements can also be made easier by rotating the in-wavelength-order assignment of the light beams to the beam paths such that the wavelengths of the light beams incident on each filter element or additional filter element are offset in wavelength from the wavelength(s) at which the transmission characteristics of the filter element or additional filter exhibits artifacts. A filter element or additional filter element having a relatively broad pass band or stop band at a relatively long wavelength may exhibit an unwanted artifact at substantially shorter wavelengths. Such an artifact would be problematical when the filter element or additional filter element transmits or reflects a light beam having a wavelength corresponding to the wavelength at which the artifact occurs. Artifacts are more likely to occur when the cut-on or cut-off is a steep one, i.e., the cut-on or cut-off occurs between the wavelengths of a closely-spaced wavelength pair, when the filter element has a both cut-on and a cut-off (as in a band-pass characteristic), or when the filter element is required to transmit or reflect over continuous, broad wavelength ranges. By assigning the light beams to the beam paths in a manner that offsets the wavelength of the light incident on the filter from the wavelength of an artifact, the artifact will not impair the transmission characteristics of the filter with respect to the wavelength of the incident light.

In the examples of multiplexers in accordance with various embodiments of the invention described in this disclosure, the positions and orientations of the various elements are described using such precise descriptors as orthogonal, parallel, at 45°, equal, in the x-direction, in the y-direction and in the z-direction. Although their design may be more challenging than that of the above-described examples, in other examples of multiplexers in accordance with various embodiments of the invention, at least some of the elements have positions and orientations that are not in precisely in accordance with the above-mentioned precise descriptors and yet will combine multiple light beams into a single combined beam. In this disclosure, such a descriptor will be regarded as having its precise meaning and as additionally encompassing a range of deviation from its precise meaning that nevertheless allows a multiplexer incorporating such element described by the descriptor to combine multiple light beams into a single combined beam. To achieve this result may require a compensating deviation in the position or orientation of another element of the multiplexer.

This disclosure describes the invention in detail using illustrative embodiments. However, the invention defined by the appended claims is not limited to the precise embodiments described.

We claim:

1. An optical wavelength multiplexer/demultiplexer, comprising:
   a planar first filter element;
   a planar second filter element offset from the first filter element in a first direction to receive light reflected and transmitted from a first location on the first filter element, the second filter element and the first filter element having orthogonal surface normals; and
   a planar reflector parallel to the second filter element and offset therefrom in a second direction to receive light reflected and transmitted from a second location on the first filter element, the second direction orthogonal to the first direction, the second location offset from the first location in the second direction; in which:
   each of the filter elements is configured to transmit light and to reflect light in respective non-overlapping wavelength ranges; and
   one of the first filter element and the second filter element has one of (a) a band-pass transmission characteristic, and (b) a band-stop transmission characteristic.

2. The multiplexer/demultiplexer of claim 1, in which:
   light beams having mutually-different wavelengths are incident on the first filter element, a first one of the beams incident at the first location and transmitted by the first filter element, a second one of the light beams incident at the second location and transmitted by the first filter element, a third one of the light beams incident at the second location and reflected by the first filter element, a fourth one of the light beams incident at the first location and reflected by the first filter element; and the first filter element, the second filter element and the reflector are arranged such that the light beams are output as a combined beam after transmission and reflection by the second filter element.

3. The multiplexer/demultiplexer of claim 2, in which:
   the light beams are incident on the first filter element along respective beam paths having a circular order as follows:
   a beam path extending towards the first location and reflected by the first filter element,
   a beam path extending toward the second location and reflected by the first filter element,
   a beam path extending towards the second location and transmitted by the first filter element, and
   a beam path extending towards the first location and transmitted by the first filter element; and
   the light beams in order of increasing wavelength are assigned to respective ones of the beam paths in the circular order or a reverse thereof.

4. The multiplexer/demultiplexer of claim 3, in which the light beams are assigned to the beam paths such that the first filter element and the second filter element have respective transmission characteristics no more complex than one of (a) a band-pass characteristic and (b) a band-stop characteristic.

5. The multiplexer/demultiplexer of claim 3, in which:
   in pairs of the light beams adjacent in wavelength, the light beams in each of the pairs have a proportional wavelength spacing equal to a quotient of a difference between the wavelengths and a sum of the wavelengths; and
   when the proportional wavelength spacings for all the light beams are non-uniform:
   the proportional wavelength spacings are ranked from small to large to provide a ranking, the ranking comprising a small proportional wavelength spacing portion;
   pairs of light beams having proportional wavelength spacings in the small proportional wavelength spacing portion of the ranking are closely-spaced wavelength pairs; and
   the light beams are assigned to the beam paths in such a manner that none of the filter elements has (a) a cut-on and (b) a cut-off wavelength between the wavelengths of more than one closely-spaced wavelength pair respectively incident thereon.

6. The multiplexer/demultiplexer of claim 3, in which:
   in pairs of light beams adjacent in wavelength, the wavelengths of light beams in each of the pairs have a proportional wavelength spacing equal to a quotient of a difference between the wavelengths and a sum of the wavelengths; and
   when the proportional wavelength spacings of the light beams are non-uniform, the light beams are assigned to the beam paths such that the wavelengths of the light beams incident on each one of the filter elements are offset from artifacts in the reflection and transmission characteristics of the one of the filter elements.

7. The multiplexer/demultiplexer of claim 1, in which the reflector has a wavelength-dependent reflectivity.

8. The multiplexer/demultiplexer of claim 1, in which the other of the first filter element and the second filter element has one of (a) a short-pass transmission characteristic, and (b) a long-pass transmission characteristic.

9. The multiplexer/demultiplexer of claim 1, in which at least one of the first filter element and the second filter element respectively comprises a transparent wafer and a dichroic filter on a surface of the wafer.

10. The multiplexer/demultiplexer of claim 1, in which at least one of the first filter element and the second filter element respectively comprises a dichroic filter located between a transparent first triangular prism and a transparent second triangular prism.

11. The multiplexer/demultiplexer of claim 1, in which:
the first filter element comprises a first dichroic filter located between a transparent first rhomboidal prism and a transparent first additional prism; and
the second filter element comprises a second dichroic filter located between a transparent second rhomboidal prism and a transparent second additional prism.

12. The multiplexer/demultiplexer of claim 11, in which:
the second rhomboidal prism comprises a first major surface and a second major surface opposite in the first major surface;
the second dichroic filter is located adjacent a first major surface; and
the second major surface provides the second reflector and is parallel to the first major surface.

13. An optical wavelength multiplexer/demultiplexer, comprising:
a planar first filter element;
a planar first reflector parallel to the first filter element and offset therefrom in a third direction;
a planar second filter element offset from the first filter element in a first direction to receive light reflected and transmitted from a first location on the first filter element, the second filter element and the first filter element having orthogonal surface normals;
a planar second reflector parallel to the second filter element and offset therefrom in a second direction to receive light reflected and transmitted from a second location on the first filter element, the second direction orthogonal to the first direction and to the third direction, the second location offset from the first location in the second direction; in which:
each of the filter elements is configured to transmit light and to reflect light in a respective non-overlapping wavelength ranges; and
at least one of the first filter element and the second filter element has one of (a) a band-pass transmission characteristic and (b) a band-stop transmission characteristic.

14. The multiplexer/demultiplexer of claim 13, in which light beams having mutually-different wavelengths are incident on the first filter element at the first location, at the second location, at the second location after reflection by the first reflector, and at the first location after reflection by the first reflector; and
the first filter element, the second filter element, the first reflector and the second reflector are arranged such that light beams are output as a combined beam after transmission and reflection by the second filter element.

15. The multiplexer/demultiplexer of claim 14, in which:
the light beams are incident on the first filter element and the first reflector along respective beam paths having a circular order as follows:
a beam path extending towards the first location on the first filter element and one of (a) transmitted and (b) reflected by the first filter element,
a beam path extending towards the second location on the first filter element and one of (a) transmitted and (b) reflected by the first filter element,
a beam path extending towards the first reflector and reflected thereby towards the second location on the first filter element, and the other of (a) transmitted and (b) reflected by the first filter element, and a beam path extending towards the first reflector and reflected thereby towards the first location one of the first filter element, and the other of (a) transmitted and (b) reflected by the first filter element; and
the light beams are incident in order of increasing wavelength along respective ones of the beam paths in the circular order or a reverse thereof.

16. The multiplexer/demultiplexer of claim 13, in which the first reflector has a wavelength-dependent reflectivity.

17. The multiplexer/demultiplexer of claim 13, in which:
the first filter element, the first reflector, the second filter element, and the second reflector collectively constitute a first multiplexer module;
the multiplexer/demultiplexer additionally comprises a second multiplexer module, the second multiplexer module comprising:
a planar first filter element;
a planar first reflector parallel to the first filter element and offset therefrom in a third direction;
a planar second filter element offset from the first filter element in a first direction to receive light reflected and transmitted from a first location on the first filter element, the second filter element and the first filter clement having orthogonal surface normals; and
a planar second reflector parallel to the second filter element and offset therefrom in a second direction to receive light reflected and transmitted from a second location on the first filter element, the second direction orthogonal to the first direction and to the third direction, the second location offset from the first location in the second direction; and
one of the first reflector and the second reflector of the second multiplexer module is located to receive a combined beam output by the first multiplexer module and has a wavelength-dependent reflectivity configured to transmit the combined beam.

18. The multiplexer/demultiplexer of claim 17, in which at least one of the multiplexer modules additionally comprises one or more additional filter elements located between at least one of (a) the first filter element thereof and the first reflector thereof, and (b) the second filter element thereof and the second reflector thereof, each of the additional filter elements parallel to the respective on of (a) the first filter element thereof, and (b) the second filter element thereof, and progressively offset therefrom in a respective one of (a) the third direction, and (b) the second direction.

19. An optical wavelength multiplexer/demultiplexer, comprising:
a planar first filter element;
a planar first reflector parallel to the first filter element and offset therefrom in a third direction;
a planar second filter element offset from the first filter element in a first direction to receive light reflected and transmitted from a first location on the first filter element, the second filter element and the first filter element having orthogonal surface normals;
a planar second reflector parallel to the second filter element and offset therefrom in a second direction to receive light reflected and transmitted from a second location to the first filter element, the second direction orthogonal to the first direction and to the third direction, the second location offset from the first location in the second direction; and
one or more additional filter elements between at least one of (a) the first filter element and the first reflector, and (b) the second filter element and the second reflector, each of the additional filter elements parallel to the respective one of (a) the first filter element, and (b) the second filter element, and progressively offset therefrom in a respective one of (a) the third direction, and (b) the second direction; in which each of the filter elements is configured to transmit light and to reflect light in mutually-exclusive wavelength ranges; and at least one of the first filter element and the second filter element has one of (a) a band-pass transmission characteristic, and (b) a band-stop transmission characteristic.

20. The multiplexer/demultiplexer of claim 19, in which at least one of the additional filter elements respectively comprises a dichroic filter located between a transparent first rhomboidal prism and a transparent second rhomboidal prism.

21. The multiplexer/demultiplexer of claim 19, in which others of the filter elements and additional filter elements respectively have one of (a) a short-pass transmission characteristic and (b) a long-pass transmission characteristic.

22. The multiplexer/demultiplexer of claim 19, in which:
the first filter element, the first reflector and, when present, the one or more additional filter elements between the first filter element and the first reflector collectively constitute first elements, and collectively number M;

the second filter element, the second reflector, and, when present, the one or more additional filter elements between the second filter element and the second reflector collectively constitute second elements, and collectively number N;

the first elements and the second elements collectively number P (=M+N);

no more than (2P−4) light beams having mutually-different wavelengths incident on the multiplexer/demultiplexer via respective beam paths are output after reflection and transmission by the second filter element as a combined beam; and no more than N of the beam paths extend towards spatially-separated locations on each of the first elements.

23. The multiplexer/demultiplexer of claim 22, in which:
the no more than (2P−4) beam paths are arranged in accordance with rules comprising:

the no more than (2P−4) beam paths are numbered using a circular numbering scheme;

the beam paths extend towards the first elements at locations constituting at least part of an M-column, N-row rectangular array, the columns parallel to the second direction;

no more than N consecutively-numbered beam paths extend towards respective locations in a first column, the first column being an edge column;

for each remaining column progressively offset from the first column, no more than N consecutively-numbered beam paths extend towards respective locations therein, the beam paths incident on the column being numbered one or both of (a) consecutively greater than, and (b) consecutively less than the beam paths already assigned;

no more than M consecutively-numbered beam paths extend towards respective locations in a first row, the first row being an edge row; and for each remaining row progressively offset from the first row, no more than M consecutively-numbered beam paths extend towards respective locations therein, the beam paths incident on the row being numbered one or both of (a) consecutively greater than, and (b) consecutively less than the beam paths already assigned; and the light beams in order of one of (a) increasing wavelength, and (b) decreasing wavelength, are assigned to respective ones of the beam paths in the circular order.

24. The multiplexer/demultiplexer of claim 23, in which:
in pairs of the light beams adjacent in wavelength, the light beams in each of the pairs have a proportional wavelength spacing equal to a quotient of a difference between the wavelengths and a sum of the wavelengths; and when the proportional wavelength spacings are non-uniform:

the proportional wavelength spacings are ranked from small to large to provide a ranking, the ranking comprising a small proportional wavelength spacing portion, pairs of the light beams having proportional wavelength spacings in the small proportional wavelength spacing portion of the ranking are closely-spaced wavelength pairs; and the light beams are assigned to the beam paths in such a manner that none of the filter elements and additional filter elements has (a) a cut-on and (b) a cut-off wavelength between the wavelengths of more than one closely-spaced wavelength pair respectively incident thereon.

* * * * *

UNITED STATES PATENT AND TRADEMARK OFFICE
CERTIFICATE OF CORRECTION

| | | |
|---|---|---|
| PATENT NO. | : 7,738,750 B2 | Page 1 of 1 |
| APPLICATION NO. | : 12/113033 | |
| DATED | : June 15, 2010 | |
| INVENTOR(S) | : Alan C. Graham et al. | |

It is certified that error appears in the above-identified patent and that said Letters Patent is hereby corrected as shown below:

In column 37, line 51, in Claim 1, delete "which;" and insert -- which: --, therefor.

In column 37, line 55, in Claim 1, delete "clement" and insert -- element --, therefor.

In column 38, line 10, in Claim 3, delete "toward" and insert -- towards --, therefor.

In column 38, line 37, in Claim 5, delete "of light" and insert -- of the light --, therefor.

In column 38, line 47, in Claim 6, delete "of light" and insert -- of the light --, therefor.

In column 39, line 15, in Claim 12, after "opposite" delete "in".

In column 39, line 39, in Claim 13, after "in" delete "a".

In column 39, lines 42-43, in Claim 13, delete "characteristic" and insert -- characteristic, --, therefor.

In column 39, lines 51-52, in Claim 14, delete "that light" and insert -- that the light --, therefor.

In column 40, line 24, in Claim 17, delete "clement" and insert -- element --, therefor.

In column 40, line 43, in Claim 18, delete "on" and insert -- one --, therefor.

In column 40, line 60, in Claim 19, delete "to" and insert -- on --, therefor.

Signed and Sealed this

Twenty-seventh Day of July, 2010

David J. Kappos
*Director of the United States Patent and Trademark Office*